United States Patent
Buehler et al.

(10) Patent No.: US 7,687,112 B2
(45) Date of Patent: Mar. 30, 2010

(54) SURFACE FOR REDUCED FRICTION AND WEAR AND METHOD OF MAKING THE SAME

(75) Inventors: Jane E. Buehler, Spokane, WA (US); Kay Dean Bowles, Spokane, WA (US); Wade Bowles, Spokane, WA (US)

(73) Assignee: Kinetitec Corporation, Spokane, WA (US)

( * ) Notice: Subject to any disclaimer, the term of this patent is extended or adjusted under 35 U.S.C. 154(b) by 463 days.

(21) Appl. No.: 11/477,569

(22) Filed: Jun. 30, 2006

(65) Prior Publication Data

US 2010/0011826 A1 Jan. 21, 2010

Related U.S. Application Data

(63) Continuation-in-part of application No. 11/179,633, filed on Jul. 13, 2005.

(60) Provisional application No. 60/587,512, filed on Jul. 14, 2004.

(51) Int. Cl.
| C23C 24/04 | (2006.01) |
| C23C 24/00 | (2006.01) |
| B32B 3/10  | (2006.01) |
| B32B 3/00  | (2006.01) |
| B32B 5/14  | (2006.01) |

(52) U.S. Cl. .................. 427/372.2; 427/287; 427/397.7; 427/421.1; 427/427; 427/427.1

(58) Field of Classification Search ........................ None
See application file for complete search history.

(56) References Cited

U.S. PATENT DOCUMENTS

| 2,038,415 A | 4/1936 | Lefevre |
| 3,574,658 A | 4/1971 | Fulk et al. |
| 3,632,368 A | 1/1972 | Nelson |
| 3,754,976 A | 8/1973 | Babecki et al.. |
| 3,765,923 A | 10/1973 | Bender-Christensen |
| 4,228,670 A | 10/1980 | Corti et al. |
| 4,269,868 A | 5/1981 | Livsey |
| 4,287,740 A | 9/1981 | Kumar |
| 4,300,474 A | 11/1981 | Livsey |
| 4,330,027 A | 5/1982 | Narasimhan |

(Continued)

FOREIGN PATENT DOCUMENTS

JP 62099081 A 5/1987

(Continued)

OTHER PUBLICATIONS

JP 2006-336822 english absract, Hatanaka et al, Dec. 2008.*

(Continued)

*Primary Examiner*—Jennifer McNeil
*Assistant Examiner*—Jason L Savage
(74) *Attorney, Agent, or Firm*—Jacobson Holman PLLC

(57) ABSTRACT

A process for producing an enhanced friction reducing surface by bonding a dry lubricant to a substrate by way of high velocity mechanical impact and low temperature diffusion bonding, and the friction-reduced surface produced thereby. A process for bonding the dry lubricant by peening and concurrently obtaining a desired dimpling or surface texturizing by appropriate selection of peening particle size and hardness relative to the substrate, as well as impact velocity against the substrate, is also provided.

36 Claims, 14 Drawing Sheets

U.S. PATENT DOCUMENTS

| | | | |
|---|---|---|---|
| 4,484,988 A | 11/1984 | Robinson | |
| 4,508,396 A | 4/1985 | Doi et al. | |
| 4,552,784 A | 11/1985 | Chu et al. | |
| 4,553,417 A | 11/1985 | Badger | |
| 4,655,945 A | 4/1987 | Balsells | |
| 4,714,622 A | 12/1987 | Omori et al. | |
| 4,753,094 A * | 6/1988 | Spears | 72/53 |
| 5,087,486 A | 2/1992 | DeVos et al. | |
| 5,262,241 A | 11/1993 | Huggins | |
| 5,403,882 A | 4/1995 | Huggins | |
| 5,441,763 A | 8/1995 | Kuo | |
| 5,860,747 A | 1/1999 | Wan et al. | |
| 6,036,996 A | 3/2000 | Martin | |
| 6,375,762 B1 | 4/2002 | Deimel | |
| 6,423,419 B1 | 7/2002 | Teer et al. | |
| 6,521,349 B1 | 2/2003 | Konig et al. | |
| 6,523,456 B1 | 2/2003 | Kobayashi et al. | |
| 6,679,798 B1 | 1/2004 | Takagi et al. | |
| 6,689,424 B1 | 2/2004 | Wang et al. | |
| 2005/0129803 A1 | 6/2005 | Umeda et al. | |
| 2007/0009667 A1 | 1/2007 | Gould et al. | 427/427.5 |

FOREIGN PATENT DOCUMENTS

| | | |
|---|---|---|
| JP | 62207822 A | 9/1987 |
| JP | 06159373 A | 6/1994 |
| JP | 11315868 | 11/1999 |
| JP | 2000178720 A | 6/2000 |
| JP | 2006131947 | 5/2005 |
| WO | 02/099019 * | 12/2002 |

OTHER PUBLICATIONS

WO 02/099019 english abstract, Kato et al, Dec. 2002.*

JP 57-044431 english abstract, Furukawa, Mar. 1982.*

* cited by examiner

SURFACE FOR REDUCED FRICTION AND WEAR AND METHOD OF MAKING THE SAME

This application is a continuation-in-part application of co-pending U.S. Ser. No. 11/179,633 filed Jul. 13, 2005, which claims the priority of U.S. provisional application Ser. No. 60/587,512 filed Jul. 14, 2004, and is entitled to and hereby claims the priority thereof for the common subject matter set forth herein.

BACKGROUND OF THE INVENTION

1. Field of the Invention

The present invention relates to the application of dry lubricants to metal substrates and, more particularly, to an enhanced friction-reducing surface and method by which a dry lubricant layer is applied both onto and into the metal substrate surface for enhanced wear performance over time.

2. Description of the Related Art

Films of friction-reducing dry lubricants such as molybdenum disulfide ($MoS_2$), tungsten disulfide ($WS_2$), graphite, etc. have been applied to various metal substrates, generally by spraying or dipping methods followed by drying or baking. Other methods such as chemical and vapor deposition have also been used.

The transfer of the dry lubricant film to the metal substrate according to these traditional methods is primarily a mechanical process by which a mixture of dry lubricant chemicals and peening particles is impacted against the substrate at a high enough velocity to adhere a thin layer of the dry lubricant chemicals to the top of the substrate surface. This thin layer may be adequate for certain limited applications, but when the treated surface is subjected to high wear, the dry lubricant is quickly removed. As a result, metal parts such as pistons, rings, bearings, journals, valve stems, shafts, and the like, which could greatly benefit from the low friction characteristics and protection provided by dry lubricants, are often excluded from treatment or obtain limited benefit therefrom due to the rapid deterioration in the lubricant coating in such high-wear environments.

In an effort to help the dry lubricants adhere to the surface of the substrate, some previous methods employ the use of solvents and binders. This is often unfavorable due to the added complexity and cost of the complex formulations of solvents, pigments, dispersants, binders and curing agents. Also unfavorable are the environmental health and safety concerns to be dealt with when using such compounds, as well as the dimensional build-up on the treated part.

Surface texturing has been found to be useful in helping to control friction and wear between two rubbing surfaces. Some of the known methods of surface texturing in use are machine methods such as turning, drilling, etc., laser texturing by drilling small holes using a laser, and electron beam texturing. These known methods require expensive equipment and the performance of a separate stage of treatment which is a disadvantage in that additional processing steps are required. These disadvantages are increased by the fact that no single texture type or size is sufficient for all applications such that the desired surface texture, including size and shape of features, must be determined on a case-by-case basis. This means that the expense and extra time associated with using the equipment may have to be repeated multiple times before the desired degree of surface texturing is determined and obtained.

Hence, there is a need for a method of surface texturing that can be performed simultaneously with the application of dry lubricant while offering control capability so as to be able to obtain variable levels of texturing in order to enhance surface performance specific to the end use of the treated substrate.

Also, so far as is known, no feasible way has emerged for treating metal surfaces with friction-reducing dry lubricant chemicals in such a way that the dry lubricant forms a long-wearing, high-endurance surface layer and in which the process required for application of the layer is manufacturer friendly.

SUMMARY OF THE INVENTION

It is therefore an object of the present invention to provide a reduced-friction surface meeting the above needs. Accordingly, the present invention is directed to a process by which dry lubricant is applied onto the surface of a metal substrate so as to penetrate therein, and the modified substrate resulting from such process.

The present invention is also directed to a method of surface texturing or "dimpling" that is performed simultaneously with the application of the dry lubricant to a substrate by peening to produce a friction and wear-reducing surface with improved characteristics for enhanced operating and wear performance over time. The formation of dimples is controlled in a tunable manner such that enhanced surfaces may be produced for a wide variety of applications.

According to the inventive method, the substrate to be treated is first pre-cleaned and then impinged with an abrasive media to create an interlocking, oxide-free surface suitable for application of a dry lubricant. After removing residual abrasive media from the substrate surface, the dry lubricant mixed with shot particles is applied thereto via a conventional shot peening technique which produces enough kinetic energy upon impact of the shot particles against the metal substrate that not only is the dry lubricant driven into the surface, but a strong metallurgical bond is formed. Excess unbonded lubricant is removed and the lubricant metallurgically bonded to the metal substrate is then low temperature diffusion bonded at a temperature of less than 50% of the melting point of the metal substrate. The stored energy from the metallurgical bond, in combination with the low temperature heating, combine to cause the dry lubricant to migrate more deeply into the sub-surface of the substrate. If desired, another application of dry lubricant may be thereafter applied to the substrate to finish the surface, with a final cleaning operation at the conclusion thereof.

The present invention is further directed to a modified substrate having an outer surface layer mechanically bonded with a dry lubricant and a sub-surface layer beneath the outer layer into which said dry lubricant has penetrated. Such a modified substrate made by the disclosed method, namely through impingement processing followed by low temperature diffusion bonding, is also within the intended scope of the present invention.

The present invention is yet further directed to a method of simultaneous surface dimpling and delivery of dry lubricant to a surface to reduce friction and reduce wear while controlling the resulting surface morphology. Specifically, the shot media used to deliver the dry lubricant is selected according to its relative hardness, size, and/or material type as compared to the substrate to be coated, and is then delivered at an appropriate velocity to not only apply the dry lubricant but also produce a desired dimpling saturation and resulting alteration in the particular surface material being impacted.

Accordingly, it is an object of the present invention to provide a process that produces, through the combination of impingement with solid state low temperature diffusion bonding, a deeper penetration of the friction-reducing dry lubricant into the surface and sub-surface of the metal substrate than is possible with conventional shot peening techniques alone.

It is another object of the present invention to provide a process for treating metal surfaces which reduces friction through dry lubricant penetration while maintaining the dimensional integrity of the part being treated.

It is a further object of the present invention to provide a method that creates a clean and roughened surface on the metal substrate to allow for a dry lubricant to be applied by high velocity impact through conventional shot peening techniques to form a strong continuous bond between the dry lubricant and the metal surface which, when combined with low temperature diffusion bonding, enables the lubricant to penetrate into the sub-surface of the substrate.

It is yet another object of the present invention to provide a process for surface friction reduction in which the kinetic energy created from high velocity impact of peening particles on a metal surface creates a superior bond between the dry lubricant and the metal surface, rendering the metal surface amenable to low temperature diffusion bonding with the dry lubricant so as to produce further penetration of the lubricant without changing the grain structure of the metal substrate.

It is a further object of the present invention to provide a reduced-friction surface that, through modification of the sub-surface so as to increase lubricant integration with the substrate itself, is suitable for use with a wide range of products that require increased surface wear endurance properties.

It is a still further object of the present invention to provide a modified metal substrate, and treatment for producing the same, that has an outer layer dimensional modification of less than 10 microns while the underlying substrate sub-surface structure is modified to a depth of about 5-50 microns.

It is yet another object of the present invention to provide a reduced-friction substrate, having an outer surface impacted by shot peening with dry lubricant and a sub-surface penetrated by the dry lubricant, that is easy to manufacture and highly durable in use.

It is a still further object of the present invention to provide a method of applying dry lubricant by mechanical impingement and, at the same time, of texturing the substrate surface to which the dry lubricant is being applied to improve tribological performance.

It is another object of the present invention to provide a method for simultaneous application of dry lubricant to a surface by mechanical impingement and creation of dimpling on the impinged surface, with the degree of dimpling being adjustable in a controlled and tunable manner according to the relative hardness, size and/or material type of the shot media as compared with the substrate material being coated.

It is a further object of the present invention to provide a method for mechanically dimpling a surface by impacting the surface with shot media delivered at a velocity appropriate to the size, hardness and material type of the shot media relative to the surface being textured to obtain the degree and type of dimpling desired.

It is yet another object of the present invention to reduce friction and/or wear for contacting surfaces in relative motion regardless of whether the contact is primarily rolling contact or primarily sliding contact.

It is yet another object of the present invention to reduce friction and/or wear for contacting surfaces in relative motion regardless of whether the contacting surface is used dry or with lubricating oils.

These together with other objects and advantages which will become subsequently apparent reside in the details of construction and operation as more fully hereinafter described and claimed, reference being had to the accompanying drawings forming a part hereof, wherein like reference characters refer to like parts throughout.

DETAILED DESCRIPTION OF THE PREFERRED EMBODIMENTS

In describing preferred embodiments of the invention, specific terminology will be resorted to for the sake of clarity. However, the invention is not intended to be limited to the specific terms so selected, and it is to be understood that each specific term includes all technical equivalents which operate in a similar manner to accomplish a similar purpose. Furthermore, the preferred embodiments herein described are not intended to be exhaustive or to limit the invention to the precise forms disclosed. Rather, they are chosen and described to best explain the invention so that others skilled in the art might utilize its teachings.

The present invention may be practiced in various ways. For example, in accordance with the invention a dry lubricant may be applied to a substrate by mechanical impingement and thereafter subjected to low temperature diffusion bonding. Alternatively, a dry lubricant may be applied to a substrate by mechanical impingement and, simultaneously, the substrate may be textured or "dimpled" for improved wear characteristics. It is also possible to both dimple the substrate surface and employ low temperature diffusion bonding.

For purposes of clarity in discussion, however, the method by which a dry lubricant is applied to a substrate by mechanical impingement and thereafter subjected to low temperature diffusion bonding will be discussed first. The method by which a dry lubricant is applied to a substrate by mechanical impingement and, simultaneously, the substrate is "dimpled" to a desired saturation level for improved friction and wear characteristics will be discussed thereafter.

Mechanical Impingement and Low Temperature Diffusion Bonding

Figure 1:
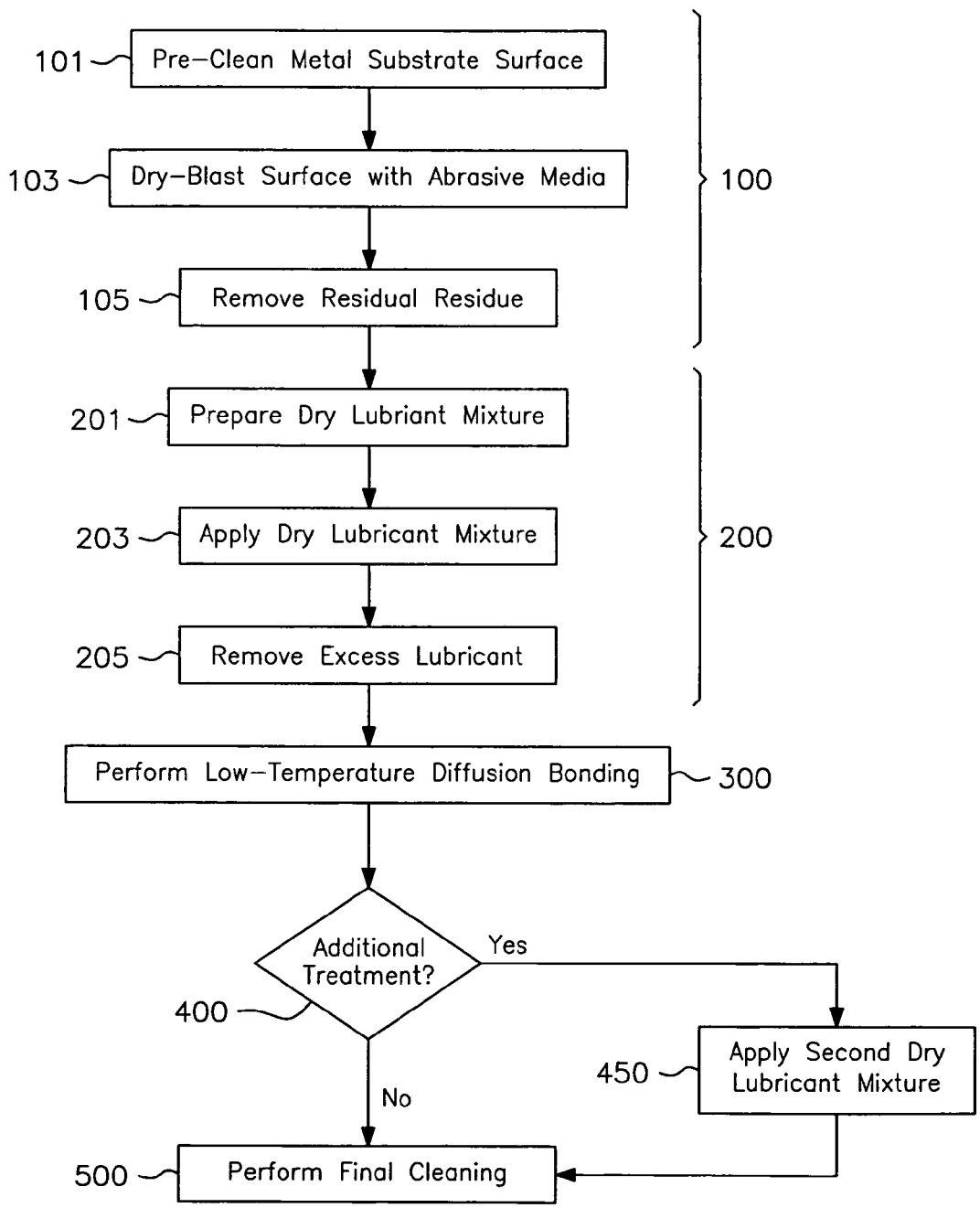
FIG. 1 is a flowchart of the method steps for producing a reduced-friction surface, in accordance with a first embodiment of the present invention.

According to the method of the present invention, a metal surface is treated so as to form a dry lubricant layer thereon that demonstrates greater depth and adherence than that produced using only conventional shot peening techniques. As will be discussed in greater detail hereinafter and as summarized in FIG. 1, the method broadly includes the steps of cleaning the surface, step 100, applying the dry lubricant thereto by impingement, step 200, and causing the lubricant to penetrate more deeply into the surface and sub-surface through subsequent low temperature diffusion bonding, step 300.

As used herein, the term "surface" is intended to refer to the outermost layer of a substrate as one would understand that term in conjunction with the part of the substrate or other object that is subject to tactile manipulation or touch, as in the "surface" of a table. Conventional shot peening or impingement processes affect only the substrate surface, creating a roughened texture to which the lubricant is better able to adhere, while not altering the sub-surface of the substrate. The term "sub-surface" is used herein to refer to portions of the substrate that are beneath the surface and therefore not normally accessible to touch, being covered by the surface layer.

The method of the present invention is suitable for a range of substrates and dry lubricants. Representative metal substrates include aluminum, titanium, copper, and the alloys thereof, as well as steel and various combinations of the foregoing metals. Substrates of ceramic and polymer may also be effectively treated.

In view of the variation in substrates to which the present invention may be applied, some variation in the specific performance of the method is generally necessary or advisable to best accommodate the specific substrate being used. Accordingly, a step preliminary to the conduct of the method is to obtain the part to be treated and to understand the surface specifications for the part so as to be able to stay within those specifications throughout the treatment process. For example, in selecting a cleaning abrasive for the cleaning step, depending upon the abrasive and the type of metal in the substrate, use of the abrasive may have an adverse impact on, i.e., increase, the surface roughness. This can occur with abrasives having hard particles or particles that are jagged in shape. Hence, use of such an abrasive is not advised when the part specification requires that the surface roughness of the part remain the same.

Once the part has been identified and its associated specifications taken into consideration, treatment of the part according to the present invention may commence.

As shown in the figure, the first step is to clean the part that is to be treated, step 100. Cleaning is preferably undertaken in three phases, namely pre-cleaning, step 101; abrasive cleaning, step 103; and the removing of excess abrasive media, step 105.

Pre-cleaning of the part, step 101, is performed to remove any obvious surface contaminants such as oil residue or dirt. Pre-cleaning allows for a more efficient abrasive cleaning step while also avoiding contamination of the blast cabinet and abrasive media to be used in step 103 such that they can be readily recycled for additional use.

Depending on the specific part, the pre-cleaning step, step 101, can be performed by blowing the part off with compressed gas (typically, air, nitrogen or argon), polishing the part in a tumbler with an abrasive media and/or by taking a clean cloth and wiping the surface. While the cloth can be dry, more preferably the cloth is saturated with a solvent that removes the surface contaminants. Care must be taken to ensure that the solvent chosen does not have an adverse effect on the surface (for example, the use of chlorine on a stainless steel surface will cause intergranular cracking). The cleaning material may generally be any of water, acetone, mineral spirits, solvents, surfactants, or combinations of the foregoing. For a more intense pre-clean, an ultrasonic cleaner may be used to clean the part. It is also possible that the manufacturing step prior to step 100 will leave the part sufficiently clean to go directly to step 103, in which case step 101 can be omitted.

After the part is pre-cleaned, it is ready for abrasive cleaning, step 103. Abrasive cleaning is generally performed by dry blasting the metal substrate with an abrasive media in an enclosure such as a blasting cabinet. The goal of dry blasting is to clean the surface of residual oxides and create an interlocking surface such that the dry lubricant chemical, when applied, latches onto and is held to the surface of the substrate. In addition, the abrasive cleaning step increases the available surface area, resulting in substantial improvement for bonding of the dry lubricant onto the surface of the substrate.

There is a wide range of abrasive media that can be chosen depending on how contaminated the surface is and what care is needed when pre-cleaning in order to stay within the part surface specifications. If there are no surface specifications, then a coarser and more abrasive cleaning media can be used, such as slag or carbide. If, on the other hand, the specification provides that the surface roughness is to be minimized, then an appropriate abrasive media would be fine glass beads, fine aluminum oxide, or other comparable abrasive media as would be known in the industry.

During the abrasive treatment, the abrasive media is entrained in a carrier gas, generally ambient air, and is directed against the substrate surface through one or more nozzles within the cabinet enclosure. The cabinet enclosure may contain an ambient air atmosphere or may have a controlled environment, i.e., an inert gas such as argon, in order to control oxidation. The need for a controlled environment will depend upon the mix of dry lubricant being used and the composition of the metal substrate.

The distance between the nozzle and the substrate surface during the abrasive treatment can be from about 0.5-6 inches, but preferably is about four inches, with a nozzle pressure ranging from 40-180 psi, and more preferably from about 80 psi-120 psi. The nozzle may be angled to be as oblique as 10 degrees relative to the substrate surface, but it is preferable to have the nozzle oriented to be substantially perpendicular to the substrate surface.

After the part has been uniformly cleaned, residual residue from the abrasive cleaning media is removed, step 105. The residual residue removal step is preferably performed by directing a compressed gas, generally air, nitrogen or argon, against the substrate surface with sufficient pressure to remove any residual abrasive cleaning media remaining adhered thereto.

When cleaning is complete, the surface is ready for application of the dry lubricant by impingement, step 200. This stage of the method includes two phases, namely preparation of a dry lubricant mixture, step 201, and application thereof to the substrate, step 202.

During dry lubricant mixture preparation, step 201, a dry lubricant mixture is made from a combination of various dry lubricants (generally metal and polymer) and peening particles. The dry lubricant mixture is mixed in an efficient way, such as with a Vee mixer, for the purpose of minimizing electrostatic and agglomeration, while maximizing the coverage of the lubricant powders onto the shot.

As a step preliminary to preparation of the mixture, a dry lubricant powder must be chosen. Typically this is $MOS_2$ and the polymer PTFE. However, a range of dry lubricants may be suitably used, including titanium, tungsten disulfide, ruthenium, carbon, tantalum, and vanadium.

The carrier media or peening particles are typically clean stainless steel shot which are typically spherical in shape. This shape allows for maximum coverage of the dry lubricant over the surface of the carrier media. The shape is also important in that, upon impact into the surface, the round shot limits the likelihood that the surface will be notched which could, in turn, create stress risers to the surface which can initiate cracks and other failures. The round shape also allows for surface compression which increases surface strength and minimizes corrosion. In addition, round shape decreases grain boundary exposure which, in turn, minimizes corrosion as the shot impacts the surface and delivers the lubricant.

When choosing sizes of powder and shot, preferably the grains of dry lubricant are no more than half the size of the shot and, more preferably, are "nano-powder size" which is usually less than 5 microns in diameter. While the size of the shot is typically a function of the hardness of the substrate, it is generally desirable to use shot size that is as small as possible from what is available, with a typical size being about 0.008 inches; however, sizes of up to 0.330 inches in diameter may be used.

When mixing the lubricant powder with the shot, enough powder has to be applied to adequately coat the shot. Care also needs to be taken when choosing the mixing technique used to coat the powder onto the shot. The purpose of the mixing is to thoroughly coat the carrier media with the dry powder(s). If this step is not done properly, several problems occur with the mixture which have an adverse effect on the impingement process step.

Specifically, problems in the mixing process lead to a mixture which exhibits degrees of segregation between the powders as well as between the powders and the carrier media, agglomeration of the powders, electrostatic charges which prevent a thorough coating of the powders to the carrier media, de-mixing of the mixture, and oxidation of the lubricant powders as well as the carrier media. Segregation, electrostatic charges and de-mixing result in poor coating of the media with the powders. This, in turn, results in less powder being transported and impinged upon the substrate by the carrier particles, resulting in non-uniform application of the lubricant powder to the substrate.

Agglomeration issues in the final mixture also lead to non-uniform treatment of the powder onto the substrate. Agglomerated powders leave heavy residue on the parts which flakes off and leads to an increase in friction rather than an improvement therein when the parts are ultimately placed into service. Finally, heavy oxidation of the powders in the mix will cause non-effective impingement of the powders to the substrate.

A blender that is the most effective to obtain a mixture best suited for the impingement process must achieve maximum blending in a minimum time, provide repeatability in blending result, allow for a gentle mixing, and provide a dust-tight environment. There are two primary types of blenders which meet these criteria. The first is the tumble-type blender which typically includes drum-type, double cone, twin shell or vee-blenders, and cross flow blenders. The second type is the low shear agitation-type blender using ribbons, low speed paddles, orbiting screw, auger screws, and other means of moving components and/or generating fluidized mixing zones in a stationary vessel.

The duration and intensity of the mixing process when combining the powders and the carrier media will affect the properties of the final mixture that is obtained. Mixing times may range from five minutes to four hours but, typically, a mixing time of between 10-80 minutes is appropriate.

To keep the oxidation of the mix as well as the powders and carrier media to a minimum, the blending vessel needs to be airtight and, if possible, back-filled with an inert gas; typically argon or nitrogen is used.

While the step of preparing the dry lubricant mixture is shown in the figure as following the cleaning, step 100, preparation of the dry lubricant mixture could, of course, be completed prior to the cleaning step or concurrently therewith as would be understood by persons of ordinary skill in the art. Accordingly, the invention is not intended to be limited to the specific sequence shown in the figure, except to the extent that the cleaning, step 100, precedes the peening process, step 200, which, in turn, precedes the low temperature diffusion bonding, step 300.

After blending the dry lubricant mixture, step 201, the mixture is transferred into a process cabinet or similar enclosure for the application of the mixture to the substrate, step 203. Care must be taken to avoid re-contamination of the cleaned part, and the use of gloves at all times is recommended.

It is also advisable to use a separate process cabinet or enclosure from that used during the cleaning, step 100, to prevent contamination. More specifically, according to the present invention, it is preferred that the processing carrier media used to apply the lubricant, step 203, be different from the abrasive media used during the cleaning, step 100. For example, the abrasive cleaning media may be aluminum oxide or glass beads, while the processing carrier media is preferably stainless steel shot. To avoid cross-contamination between the cleaning and processing media, therefore, it is preferable that two separate enclosures be used for these two steps.

The process settings for the dry lubricant application or peening step, step 203, are very similar to those used during the abrasive cleaning, step 103. The peening particles are entrained in a carrier gas, generally ambient air, and are directed against the substrate surface through one or more nozzles within the cabinet enclosure. The cabinet enclosure may contain an ambient air environment or may have a controlled environment, i.e., an inert gas such as argon, in order to control the rate of oxidation. The need for a controlled environment will depend upon the mix of dry lubricant being used and the composition of the metal substrate.

The nozzle distance for peening is generally about four inches from the surface of the substrate, although it may range from about 0.5 inches to 6 inches. The nozzle pressure may be from 40-180 psi, but is preferably in the range of 80-120 psi. While the nozzle may be angled to be as oblique as 10 degrees relative to the substrate surface, it is preferable to have the nozzle oriented to be substantially perpendicular to the substrate surface.

Treatment time for application of the dry lubricant mixture to the metal substrate can range from one to ten minutes, with a treatment duration of approximately 4 minutes generally being preferred.

Interlocking between the dry lubricant powder and the surface of the metal substrate during the impinging step creates a mechanical bond, with pressure from the impingement process pushing the dry lubricant particles into the surface of the substrate. Kinetic energy that results from the collision of the shot hitting the substrate surface essentially provides a low temperature pressure bond, also called a metallurgical bond, of the dry lubricant onto the surface of the metal substrate. Because of the fit and the stored bond energy, this impingement processing, combined with the cleaning step already performed, makes the substrate more conducive to the subsequent step of low temperature diffusion bonding, discussed hereinafter, and eliminates the need for the high temperature processing conventionally associated with diffusion bonding.

As with the cleaning step, the specific parameters of the peening processing treatment are subject to choice and will vary depending on the specific substrate material as well as the specifications and use associated therewith. For example, a longer duration of lubricant mixture application will provide more material to the surface which is good if thickness of the applied layer is desired but which may not be advantageous if the intended use of the items being treated has very tight dimensional specifications. A longer duration may also, in some cases, result in an increase in the energy stored for subsequent migration during low temperature diffusion bonding. Generally, the nozzle distance, nozzle pressure and the size of the shot are all factors that contribute to the amount of energy that is stored for the subsequent step of low temperature diffusion bonding.

After the part has been uniformly processed, it is advisable to inspect the part to ensure that all unbonded dry lubricant powder has been removed. Failure to remove such residue can result in significant performance degradation as the effect of the unbonded lubricant is opposite that intended, namely that friction in the resulting part is increased rather than reduced. Hence, to ensure removal of any residual dry lubricant and carrier media, the surface is preferably blown off by compressed air or other methods, step 205.

Upon completion of the peening processing, step 200, the part is subjected to solid state low temperature diffusion bonding, step 300, carried out in a non-reactive atmosphere. As used herein, low temperature diffusion bonding refers to a heat treatment in an oven or other heating unit at a temperature that is greater than 2% and less than 50% of the melting temperature of the metal substrate. More preferred, the low temperature diffusion bonding occurs in a heating unit at a temperature that is between 20% and 40% of the melting temperature of the substrate, and most typically at a temperature that is about 35% of the melting temperature of the substrate. By keeping the temperature below 50% of the melting point of the metal substrate, the metallurgical characteristics of the substrate, such as grain size, are maintained.

Similarly, when using non-metal substrates such as ceramic or polymer, the underlying structure of these materials is preserved through the conduct of low temperature diffusion bonding at a temperature that is at least 2% and less than 50% of the melting point of the respective substrate material.

The low temperature diffusion bonding process not only ensures strong adhesion of the pressurized consolidated dry lubricant on the substrate surface, but also drives the dry lubricant into the sub-surface region of the substrate, thereby making the lubricant part of the base metal. This penetration is achieved at such low temperatures due to the energy stored as a result of the impingement step. The stored energy facilitates migration of the lubricant grains on a molecular level, enabling the diffusion bonding step to be effectively performed at significantly lower temperatures than are possible with conventional diffusion bonding processes. Further, the combination of the stored metallurgical bond energy and the reduced heat of the low temperature diffusion bonding process, results in sub-surface modification of the substrate without the loss of metallurgical characteristics, also unlike prior art diffusion bonding processes.

To achieve this modification of the sub-surface region, the low temperature diffusion bonding process is performed for a period of time until the dry lubricant, previously pressure-bonded by impingement, penetrates the sub-surface of the substrate; preferably this penetration is on the order of at least 2-5 microns. Typically, the diffusion heat treatment has a duration of between about one and four hours, although the treatment may be as brief as one minute or as sustained as 100 hours. As one example, the low temperature diffusion bonding step can be effectively conducted at a temperature of about 400 degrees C. for a period of about 0.5 to 4.0 hours.

Figure 2:
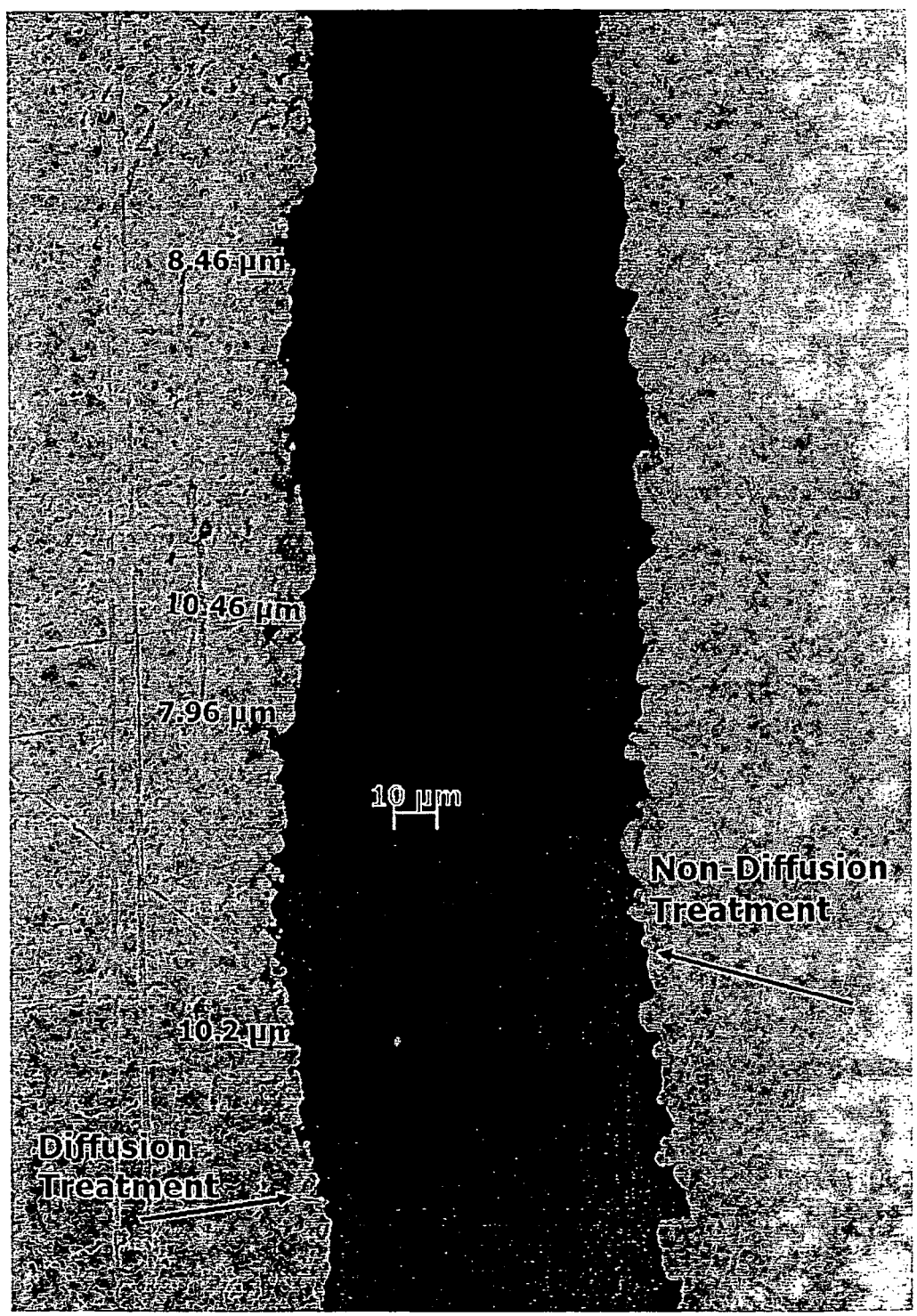
FIG. 2 is a magnified view of lubricant penetration into a substrate surface following diffusion treatment versus the penetration obtained on a second substrate surface which had not been treated with diffusion bonding.

In testing conducted using a 6061 aluminum sample divided into two halves, demonstratable penetration on the order of 8 to 11 microns resulted from treatment of the first sample half with low temperature diffusion bonding, as shown on the left side of FIG. 2. The depth of the sub-surface of the substrate which is affected or modified by the diffusion bonding process may be much greater, e.g., with a modified sub-surface layer on the order of up to 50 microns. The other half of the aluminum sample, shown on the right side of FIG. 2, was not processed by low temperature diffusion bonding and demonstrated no visible penetration of the dry lubricant when examined at 200× magnification. Further details of this testing are set forth in Example I.

Significantly, the solid state low temperature diffusion bonding step according to the present invention is unlike the conventional curing or heat treatment steps known in the prior art. Curing, which may be conducted at a range of temperatures, is intended to remove excess or unwanted moisture remaining in the processed material so as to avoid problems that might otherwise occur as a result of such retained or residual moisture, as when lumber is dried or cured to prevent subsequent warping or when ceramics are cured before kiln treatment. Conventional heat treatments, in which temperatures greater than 50% of the melting point are required, are also unlike the low temperature diffusion bonding of the present invention. In such prior art heat treatments, diffusion bonding is conducted not only at high temperatures but also under pressure from presses such as forges or vacuum hot presses. This presents a significant disadvantage in that surface treatments that require high temperature conditions such as these result in undesirable grain growth of the substrate material. With the present invention, by contrast, the impact pressure resulting from the peening process, step 203, bonds the dry lubricant powders to the substrate with stored energy, allowing for lubricant migration into the sub-surface to occur at reduced temperatures and with no requirement for physically contacting surfaces or the application of pressure to the outer surface of the substrate.

Figure 3:
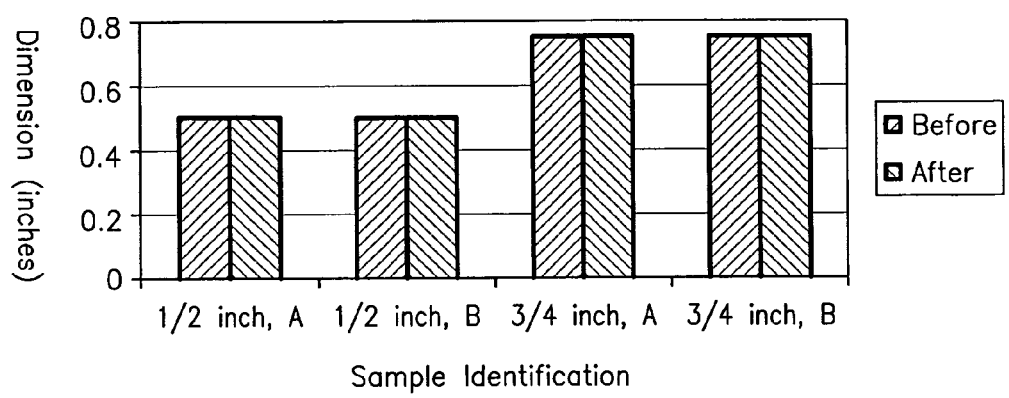
FIG. 3 depicts a dimensional comparison of high precision metal samples with measurements taken before and after diffusion treatment of the samples.

When practiced as described herein, the method according to the present invention produces a reduced-friction outer layer which increases the overall dimension of the substrate surface by not more than about 10 microns, i.e., the increase in the dimensions of the substrate and thus of the part size is minimal so as to reduce or eliminate any problems associated with meeting dimensional specifications associated with the part. The minimal dimensional impact of the low temperature diffusion bonding process has been shown through testing in which the inventive process was applied to high precision metal. Further details of this high precision dimensional testing are set forth in Example II and summarized in FIG. 3. In sum, even with the narrow tolerances to which high precision metal is subject, the variation which resulted between dimensions taken before and after the low temperature diffusion bonding treatment was less than the variation occurring along the length of each bar and, in all cases, was within the reference specification for allowable variation as enumerated in the Ryersen Stock List (Joseph T. Ryerson and Son, Inc., 1995).

The enhanced penetration obtained with the low temperature diffusion bonding process results in an integrally changed surface in which the modification extends deeply into the sub-surface of the substrate itself to create an outer "mantle". This mantle, or the combination of the surface and the modified sub-surface layers, results in an outer portion of the substrate that has, during testing with ball bearings sliding thereon, demonstrated a reduction in friction on the order of 85% as compared with the same substrate sample type having an untreated outer surface. These results are presented graphically in FIG. 4. Furthermore, the reduced friction is accompanied by an operating temperature one third that of the temperature recorded with the ball bearing running on the untreated surface, as graphically depicted in FIG. 5.

Figure 6:
FIG. 6 depicts the differences in wear incurred on a ball bearing subjected to load as it slides on a disc surface treated with diffusion bonding versus an untreated surface during the testing of FIG. 4.

These two factors of reduced friction and lowered temperature contribute to an overall reduction in wear on the ball bearing running on the treated surface of approximately 82% as compared with the wear on the ball bearing running on the untreated surface. As shown in FIG. 6, the ball running on the surface treated with low temperature diffusion bonding processing so as to alter the sub-surface exhibited a wear of about 0.90 mm, while the ball running on the untreated surface suffered wear on the order of 4.90 mm. The details of the testing which produced these results are set forth in Example III.

The reduced wear and lowered operating temperature obtained by driving the dry lubricant into the substrate sub-surface through the low temperature diffusion bonding treatment translates into significantly enhanced durability and wear life, extending the duration of the benefit obtained from the dry lubrication treatment well beyond that obtained when the lubricant is applied by conventional shot peening alone. During testing it has been shown that the conduct of the low temperature diffusion bonding process following the shot peening process extends the wear life of the processed disc by 61% to 72% as compared with the wear life of a comparable disc which has not received diffusion bonding processing. Details of this testing are provided in Example IV and summarized in FIGS. 7-11.

Once the low temperature diffusion bonding process has been completed, the treated substrate is ready for use. However, if it is determined that an additional treatment should be applied, step 400, the part can be reprocessed and coated with another layer of dry lubricant, step 450; this step is optional.

The need for a second lubricant impingement treatment is generally dependent on the part and its intended end use. Factors to be considered include whether the metal substrate is intended to increase dry lubricity, wear resistance, quick release (i.e., non-sticking effect), and/or operating temperature range.

When a second application is advised, the dry lubricant mixture applied will preferably have a different composition than that used in the first treatment and will generally have polymer compounds mixed in. Polymer compounds, such as PFTE which has a very low melting point, may be used effectively in this second application while being unsuitable for the first treatment in that vaporization thereof would be likely upon subjection to diffusion bonding, even at the low temperatures of the present invention. However, as a second polymer mixed treatment, the inclusion of the polymer is often advantageous and provides an additional level of friction reduction above and beyond the base treatment.

Finally, a last step of cleaning, step 500, is preferably performed in which unbonded lubricant is removed from the substrate by wiping the surface with a dry or damp cloth, or with the application of compressed gas, such as air, argon or nitrogen. The treated part may also be polished in a tumbler with an abrasive media or subjected to sonic cleaning.

Upon completion of the method steps as just described, it is best to package the parts in an inert environment to minimize environmental contamination and protect the surface of the substrate. This may be accomplished through the use of a double-layered bag of polyester and/or polyethylene moisture protection material that is back-filled with an inert gas such as argon and vacuum sealed. The bag may also be filled with nitrogen and vacuum sealed. Other alternative or additional packaging techniques may, of course, be used as would be known by persons of ordinary skill in the art.

The present invention is also directed to a modified substrate produced according to the foregoing method. The modified substrate has an outer surface layer mechanically bonded with a dry lubricant, and a sub-surface layer beneath the outer surface layer into which the dry lubricant has penetrated. The modified sub-surface layer extends beneath the surface layer to a depth of up to 50 microns while the mechanical bonding of the surface layer and the penetration of the dry lubricant into the sub-surface layer changes an overall dimension of the modified substrate by less than 10 microns.

As referenced in brief in the foregoing text and now set forth in full, the following Examples demonstrate the proven benefits obtained with the inventive process and give a more complete understanding thereof.

EXAMPLE I

Penetration of the dry lubricant into the substrate matrix achieved through low temperature diffusion bonding was demonstrated through comparison with a substrate to which dry lubricant had been applied by impingement but without subsequent low temperature diffusion bonding.

More specifically, a 1 inch by 3 inch sample of 6061 aluminum was treated as follows. The sample was wiped clean and then treated with an aluminum oxide abrasive (size 30 grit at 70 psi). The sample was then blown off with high pressure air and processed by impingement with steel shot (size ES450) coated with a mixture of dry lubricant ($MOS_2$ and PTFE), and applied at a pressure of 70 psi.

Upon completion of the impingement process, the sample was sectioned into two halves. The first half was set aside and did not undergo further treatment, while the second half was diffusion treated at 400° F. for a duration of four hours. (As the melting point of 6061 aluminum is 1142° F., the diffusion treatment was conducted at less than half the melting temperature for this metal alloy.) After the diffusion treatment was completed, both halves were cross-sectioned, mounted side-by-side and polished for metallographic examination.

As shown in FIG. 2, subsequent visual examination of the two halves under a microscope at 200× magnification revealed that, in the half which had undergone diffusion treatment, the dry lubricant had penetrated into the substrate to a depth of between about 7.96 microns to 10.46 microns. On the sample half that was not diffusion treated, by contrast, there was no visible penetration of the dry lubricant into the substrate.

EXAMPLE II

The overall dimensional effects of the low temperature diffusion bonding process on high precision metal were evaluated using two-½ inch and two-¾ inch cold drawn, turned ground and polished rounds (bars) of 4140 steel. The Ryerson specification for allowable variation in dimensional tolerances for both the M inch bar and the ¾ inch bar is 0.001 inches (Reference Specification from "Ryerson Stock List", Joseph T. Ryerson and Son, Inc. Copyright 1995).

At the outset, ten dimensional measurements were taken along the length of each bar using a Laser Scan Micrometer having a measurement resolution of +/−0.000002 inches. Each bar was then processed in accordance with the present invention. Specifically, the bars were wiped clean and then treated with an aluminum oxide abrasive (size 30 Grit) at 40 psi. The bars were then blown off and subjected to inpingement using steel shot (size ES180) coated with a mixture of dry lubricant of $MoS_2$ and PTFE and applied at a pressure of 70 psi. The parts were then heat treated for four hours at 400 degrees F. Upon completion of the processing, dimensional measurements were taken which are summarized in Table I; these results are graphically represented in FIG. 3.

As can be seen from the results set forth in Table I, each bar as measured before and after treatment was well within dimensional specifications. The ½-inch A bar had an average dimension of 0.501535 inches with a standard deviation of 0.000449 inches before treatment. This is well within the 0.001 inch specification for this material. After treatment, the ½-inch A bar measured 0.501571 inches with a standard deviation of 0.000658 inches, which is still well within the dimensional specifications.

Table II shows a summary of the dimensional differences between the bars as measured before treatment and after treatment. For the ½ inch A bar, the difference between the average dimensions from each bar before and after treatment is 0.00004 inches. This difference is less than the variation within each bar both before and after treatment and is also two orders of magnitude less than the specification.

As is apparent from review of Tables I and II, all of the bars had similar results, with all of the bars remaining well within dimensional tolerance limits. Therefore, based on this data, it has been demonstrated that treatment of turned, polished and ground bars with the diffusion bonding process results in no significant dimensional change.

TABLE I

Data Summary of Dimensional Measurements Before and After Treatment
Dimensional Comparison, 4140 CD HT TGP (in inches)

|  | ½ inchA | ½ inchB | ¾ inchA | ¾ inchB |
|---|---|---|---|---|
| Before | 0.501486 | 0.501398 | 0.75059 | 0.750204 |
|  | 0.501834 | 0.501022 | 0.750328 | 0.750378 |
|  | 0.50135 | 0.501476 | 0.750034 | 0.750844 |
|  | 0.501802 | 0.501752 | 0.75069 | 0.750946 |
|  | 0.50113 | .5-1782 | 0.750078 | 0.749238 |
|  | 0.501008 | 0.501726 | 0.749872 | 0.749022 |
|  | 0.501126 | 0.5012 | 0.749822 | 0.74891 |
|  | 0.501204 | 0.501148 | 0.749376 | 0.749172 |
|  | 0.502234 | 0.50073 | 0.750448 | 0.750356 |
|  | 0.502176 | 0.500628 | 0.750436 | 0.750092 |
| Average | 0.501535 | 0.501231 | 0.750167 | 0.749916 |
| Stdev | 0.000449 | 0.000376 | 0.000406 | 0.000765 |
| After | 0.501536 | 0.502245 | 0.750472 | 0.750126 |
|  | 0.5 | 0.501098 | 0.750738 | 0.750026 |
|  | 0.501832 | 0.50104 | 0.749556 | 0.749984 |
|  | 0.501956 | 0.500826 | 0.749422 | 0.749966 |
|  | 0.501042 | 0.500918 | 0.749172 | 0.749976 |
|  | 0.501256 | 0.500764 | 0.750154 | 0.749986 |
|  | 0.501538 | 0.501072 | 0.750174 | 0.74989 |
|  | 0.501876 | 0.501156 | 0.750132 | 0.749862 |
|  | 0.502322 | 0.501208 | 0.750264 | 0.750048 |
|  | 0.502354 | 0.50196 | 0.750704 | 0.751536 |
| Average | 0.501571 | 0.501229 | 0.750079 | 0.75014 |
| Stdev | 0.000658 | 0.000486 | 0.000533 | 0.000496 |

TABLE II

Difference in Dimensional Measurements Before and After Treatment
Summary of Dimensions (in inches)

|  | ½ inch, A | ½ inch, B | ¾ inch, A | ¾ inch, B |
|---|---|---|---|---|
| Before | 0.501535 | 0.501231 | 0.750176 | 0.749916 |
| After | 0.501575 | 0.501229 | 0.750079 | 0.75014 |
| Difference | 0.00004 | 0.000002 | 0.000097 | 0.000224 |

EXAMPLE III

Tests were conducted to determine friction and operating temperature reduction obtained as a result of low temperature diffusion bonding. Testing was performed to ASTM standard G99 which measures the friction of a metal ball (pin) under an applied load (force) as it slides on a rotating disc. Two discs were tested, each with a corresponding ball (pin).

In this test, the balls (pins) used were ball bearings of Grade 25, AISI 52100 bearing steel (melting point 2595 degrees F.), hardness 62 (Rc) and surface roughness 2 Ra. The discs used were EN 31 (52100) bearing steel, with surface roughness 16 Ra. One disc did not undergo any treatment. The second disc was processed as follows.

The processed disc was wiped clean and then treated with an aluminum oxide abrasive (size 30 grit) at 40 psi. The disc was blown off with high pressure air and subjected to impingement using steel shot (size ES180) coated with a mixture of dry lubricant of $MOS_2$ and PTFE and applied at a pressure of 70 psi. The disc was then diffusion treated by heating at 400 degrees F. for four hours.

Two test conditions were evaluated. Test condition "X" had an untreated ball bearing on the untreated disc. Test condition "Y" had an untreated ball bearing on the diffusion bonding treated disc. For both of the test conditions, the operational parameters were the same, namely a sliding speed of 7 m/s, a load of 3 Kg, and an initial contact pressure of 2.0 GPa.

Figure 4:
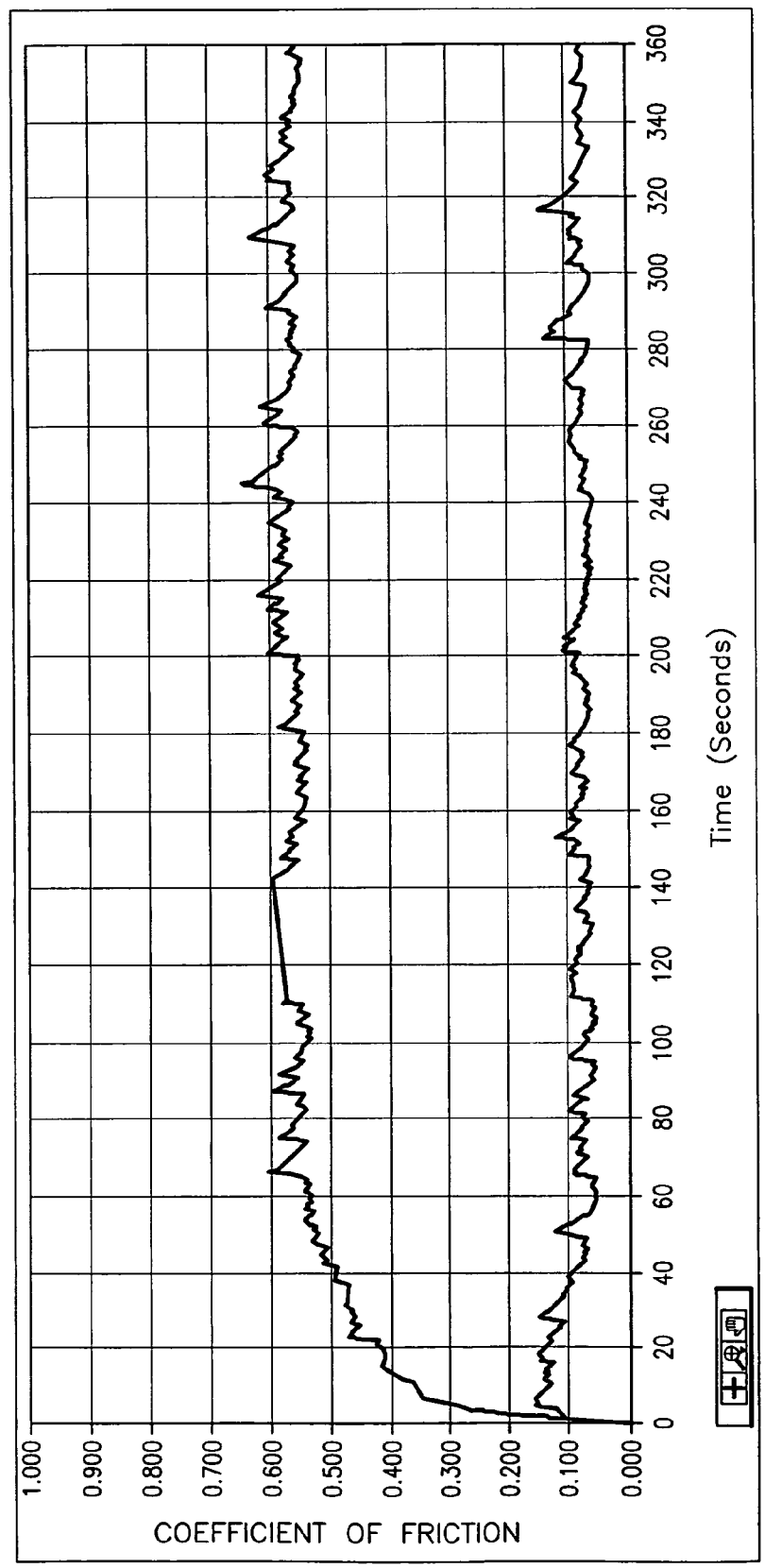
FIG. 4 is a graph illustrating frictional test results obtained during testing of disc surfaces treated with diffusion bonding versus untreated surfaces.

The raw data obtained from these two test conditions is graphically illustrated in FIG. 4. As shown, under test condition "X" represented by the top line, the average coefficient of friction was 0.55. Under test condition "Y", represented by the bottom line, by contrast, the average coefficient of friction was 0.08, representing a decrease in friction of about 85%.

Figure 5:
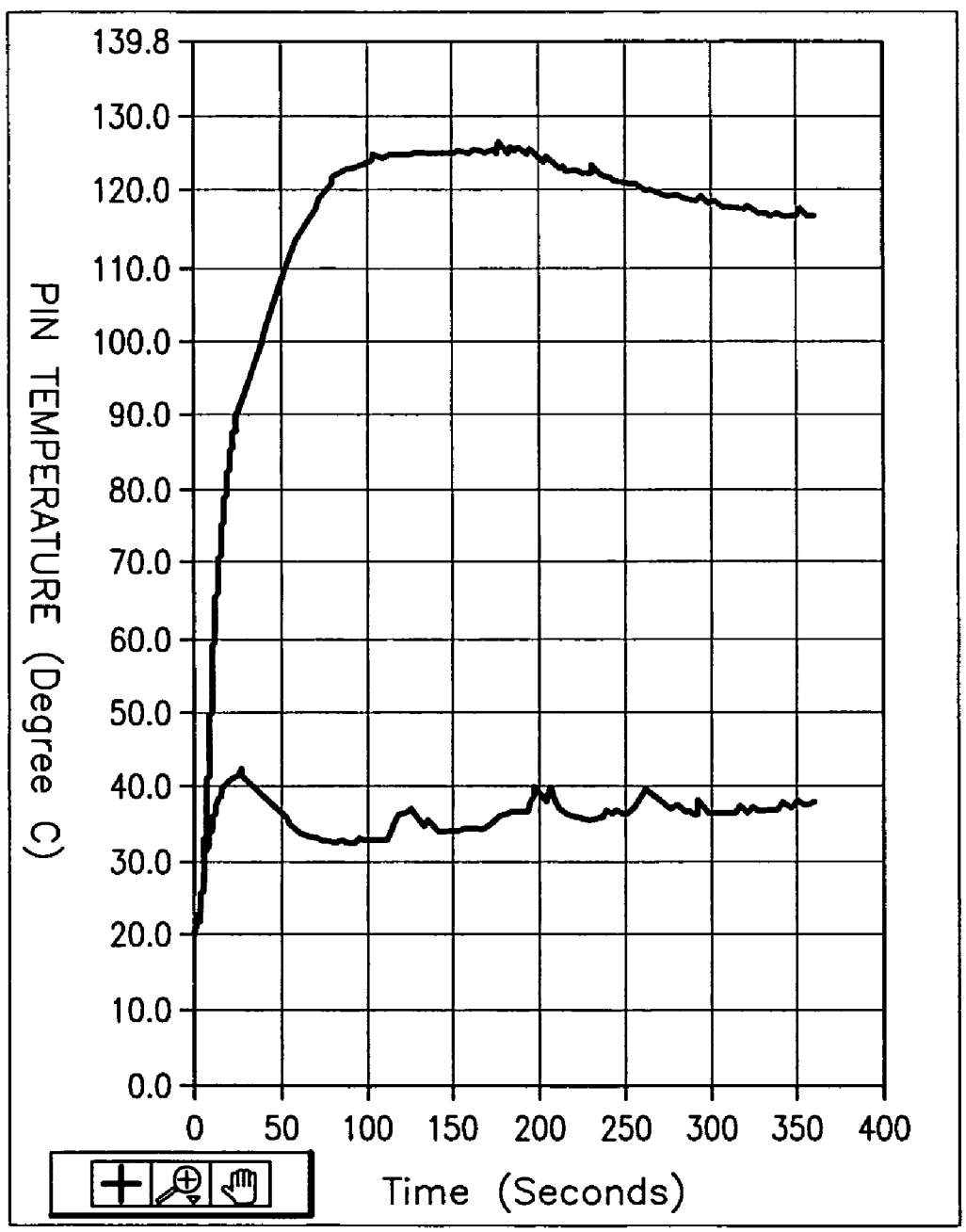
FIG. 5 is a graph illustrating operating temperatures obtained on disc surfaces treated with diffusion bonding versus untreated surfaces during the testing of FIG. 4.

Test condition "Y" also resulted in a significant decrease in operating temperature, as shown graphically in FIG. 5. Specifically, under test condition "X" represented by the top line, the average temperature was 120 degrees C., while under test condition "Y" represented by the bottom line, the average temperature was 40 degrees C.

The reduced friction and lowered temperature obtained with the diffusion treated disc resulted in significantly less actual wear on the ball bearing. More particularly, the ball bearing running under test condition "X" showed 82% more wear than the bearing running on the treated disc of test condition "Y". The impact of this wear reduction is clearly evident in FIG. 6, in which the ball on the left had been treated in accordance with the present invention and demonstrated 0.90 mm of wear, while the ball on the right had not been treated and demonstrated 4.9 mm of wear. In addition, as these tests were conducted with only one diffusion treated contact surface, further reductions in wear, friction and temperature can be expected for test conditions in which both contact surfaces have undergone diffusion treatment.

EXAMPLE IV

Durability resulting from the conduct of a low temperature diffusion bonding process following impingement was evaluated as compared with the wear life of a comparable non-treated surface to assess the effectiveness and practical feasibility of the impingement process with and without the process step of diffusion treatment. Testing was performed to ASTM standard G99 which measures the friction of a metal ball (pin) under an applied load (force) as it slides on a rotating disc. Test comparisons were conducted under various loads, and each comparison was based upon the length of time that elapsed before failure occurred. Failure was defined to have occurred when, under the subject test conditions, the coefficient of friction reached 0.4. Each comparison was run until failure occurred.

In each test comparison, the balls (pins) used were a rolling bearing steel (hardness 62 (Rc)), and the discs used were EN 31 (52100) bearing steel. Within each comparison, the operational parameters were the same, with each comparison involving two discs, for a total of four pairs of discs. Each pair of discs was initially processed as follows.

The discs were wiped clean and then treated with an aluminum oxide abrasive (size 30 grit) at 40 psi. Both discs were blown off with high pressure air and subjected to impingement using steel shot (size ES180) coated with a mixture of dry lubricant of $MOS_2$ and PTFE and applied at a pressure of 70 psi. Thereafter, only one disc was diffusion treated at 400 degrees F. for four hours, a treatment temperature well below half the melting point for 51200 steel (2595 degrees F.). The other disc, which had received the exact same impingement processing, did not receive any diffusion treatment and is referred to hereafter as the "untreated disc".

Comparison One

Figure 7:
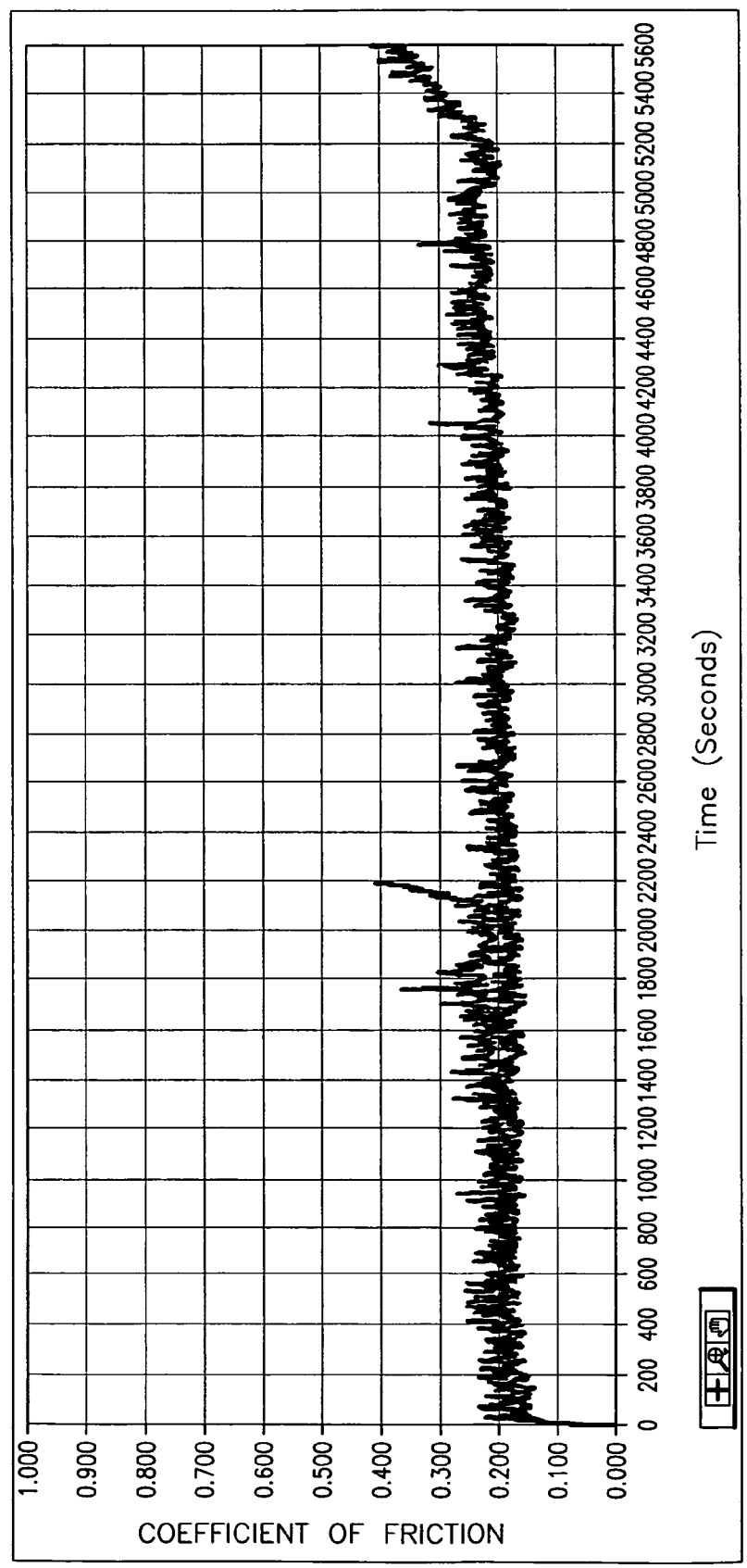
FIG. 7 is a comparative graph of duration to failure between a disc treated with the diffusion process versus an untreated disc, under a first set of test conditions.

Under the first set of test conditions, the first pair of discs were run under the same first set of test parameters: a speed of 0.75 m/s, a test diameter of 20 mm, a load of 1 Kg, and an initial contact pressure of 1.4 GPa. The test results, which are summarized in FIG. 7, show that the disc treated with the diffusion bonding process, represented by the bottom line, ran for a duration of 5596 seconds before failure occurred. The untreated disc, by comparison, failed after running for a duration of only 2184 seconds, as represented by the top line. Accordingly, the duration to failure for the disc treated with the diffusion process was 61% longer than the corresponding duration to failure of the untreated disc.

Comparison Two

Figure 8:
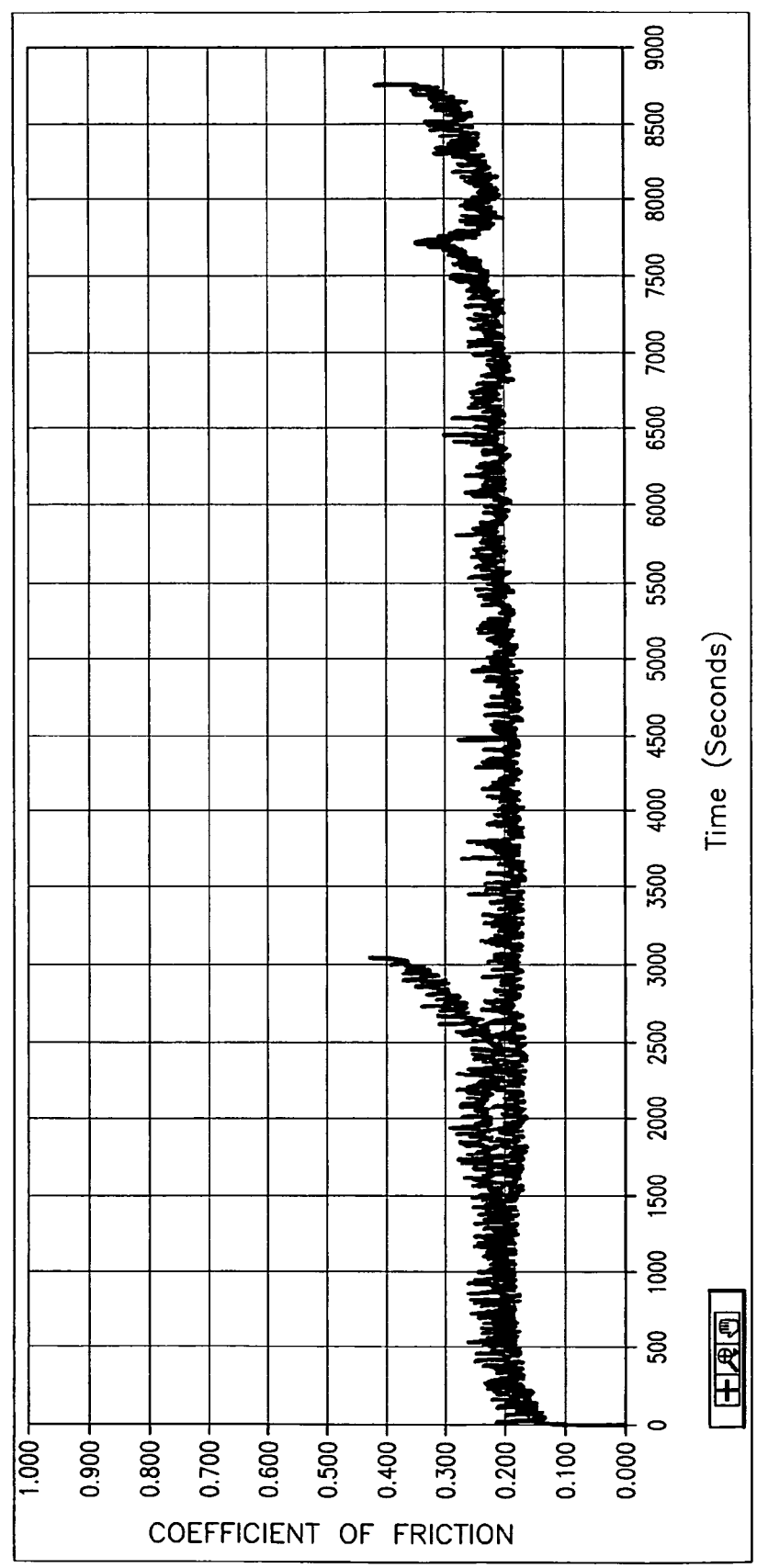
FIG. 8 is a comparative graph of duration to failure between a disc treated with the diffusion process versus an untreated disc, under a second set of test conditions.

Under the second set of test conditions, the second pair of discs were run under the same second set of test parameters: a speed of 0.75 m/s, a test diameter of 50 mm, a load of 1 Kg, and an initial contact pressure of 1.4 GPa. The test results, which are summarized in FIG. 8, show that the disc treated with the diffusion bonding process, represented by the bottom line, ran for a duration of 8750 seconds before failure occurred. The untreated disc, by comparison, failed after running for a duration of only 3037 seconds, as represented by the top line. Accordingly, the duration to failure for the disc treated with the diffusion process was 65% longer than the corresponding duration to failure of the untreated disc.

Comparison Three

Figure 9:
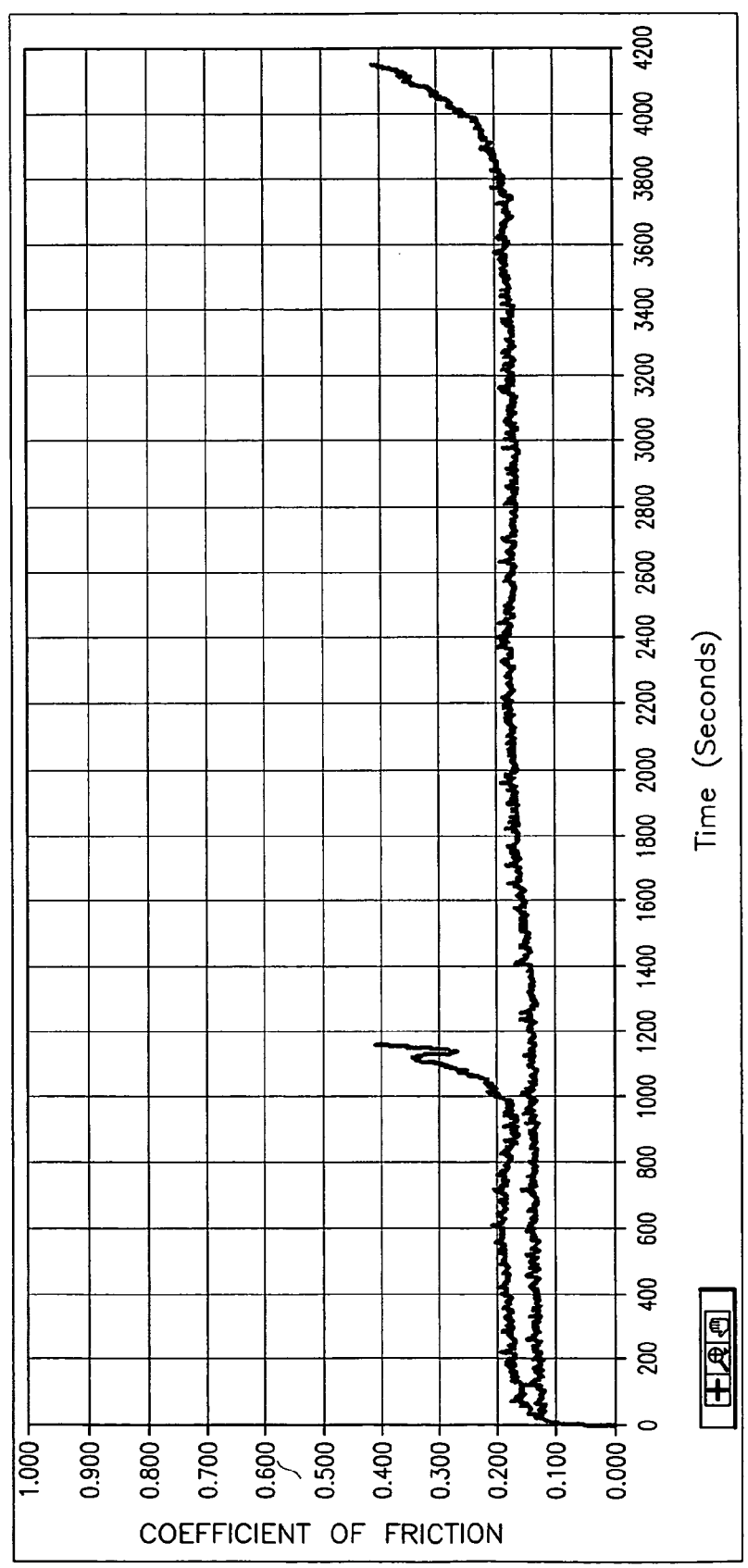
FIG. 9 is a comparative graph of duration to failure between a disc treated with the diffusion process versus an untreated disc, under a third set of test conditions.

Under the third set of test conditions, the third pair of discs were run under the same third set of test parameters: a speed of 0.75 m/s, a test diameter of 40 mm, a load of 3 Kg, and an initial contact pressure of 2.0 GPa. The test results, which are summarized in FIG. 9, show that the disc treated with the diffusion bonding process, represented by the bottom line, ran for a duration of 4154 seconds before failure occurred. The untreated disc, by comparison, failed after running for a duration of only 1160 seconds, as represented by the top line. Accordingly, the duration to failure for the disc treated with the diffusion process was 72% longer than the corresponding duration to failure of the untreated disc.

Comparison Four

Figure 10:
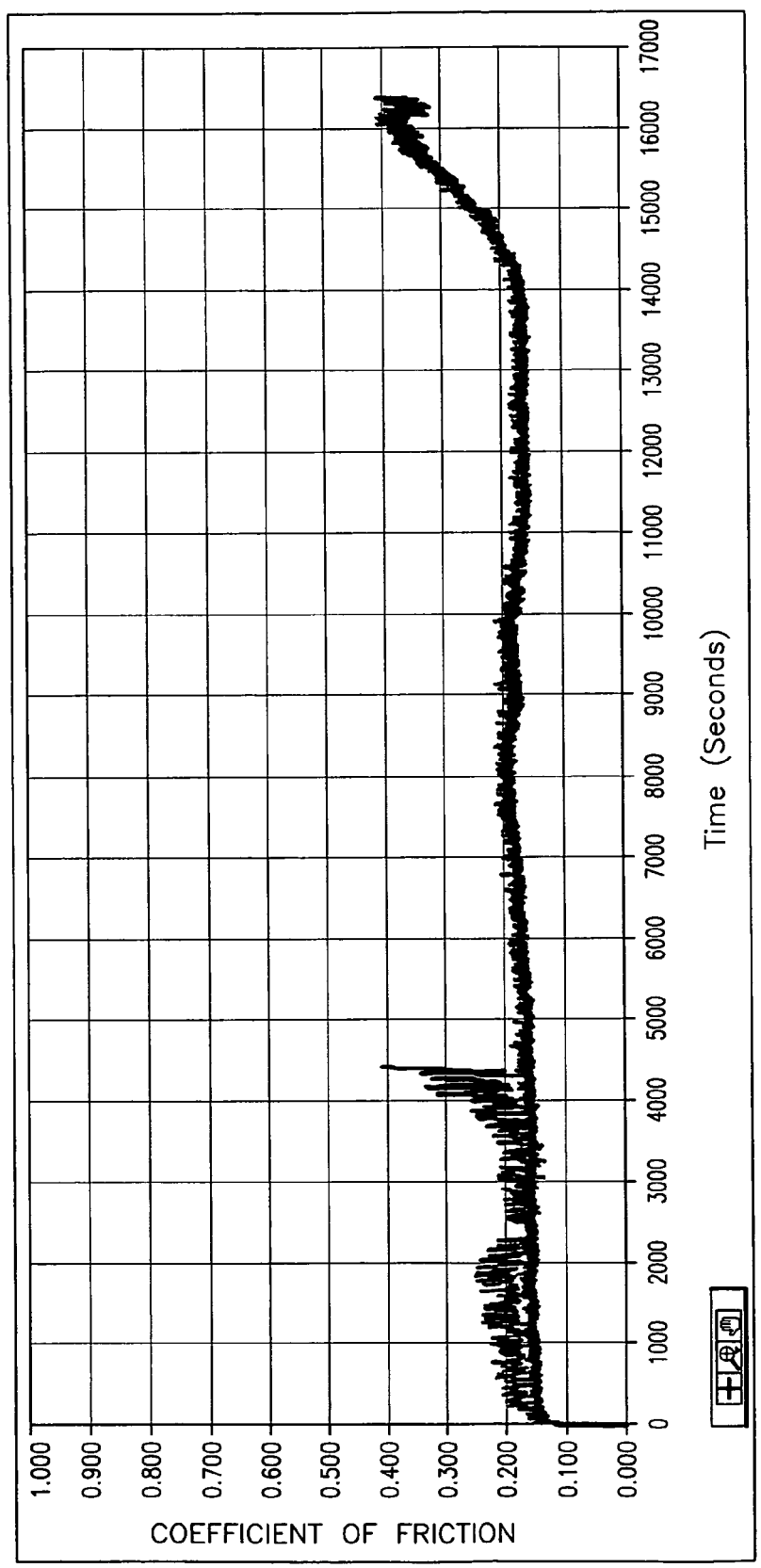
FIG. 10 is a comparative graph of duration to failure between a disc treated with the diffusion process versus an untreated disc, under a fourth set of test conditions.

Under the fourth set of test conditions, the fourth pair of discs were run under the same fourth set of test parameters: a speed of 0.75 m/s, a test diameter of 130 mm, a load of 3 Kg, and an initial contact pressure of 2.0 GPa. The test results, which are summarized in FIG. 10, show that the disc treated with the diffusion bonding process, represented by the bottom line, ran for a duration of 16384 seconds before failure occurred. The untreated disc, by comparison, failed after running for a duration of only 4417 seconds, as represented by the top line. Accordingly, the duration to failure for the disc treated with the diffusion process was 72% longer than the corresponding duration to failure of the untreated disc.

SUMMARY

Figure 11:
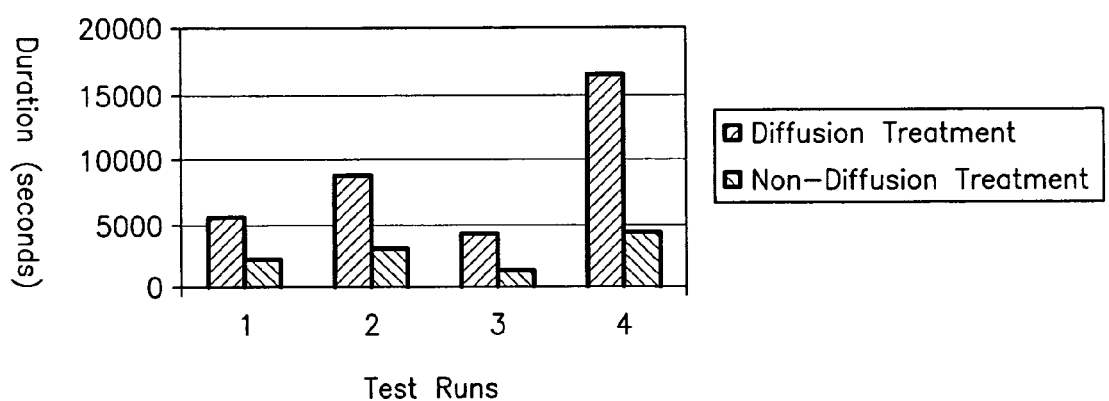
FIG. 11 is a graph summarizing the results of FIGS. 7-10.

The above four comparative pin-on-disc test results for test conditions executed at various loads and test diameters for a diffusion treated versus a non-diffusion treated disc are summarized in FIG. 11. In all cases, the useful wear life of the disc with the diffusion treatment condition was significantly extended as compared with that of the corresponding disc which had not been subjected to the diffusion treatment, for an average increase in wear life of approximately 67%.

Mechanical Impingement and Dimpling

According to the second embodiment of the present invention, a material surface is treated so as to form a dry lubricant layer thereon and simultaneously control the surface texture through dimpling. This embodiment may be performed independently of the first embodiment or may be combined therewith such that dry lubricant is applied by peening with controlled surface dimpling, followed by low temperature diffusion bonding.

Figure 12:
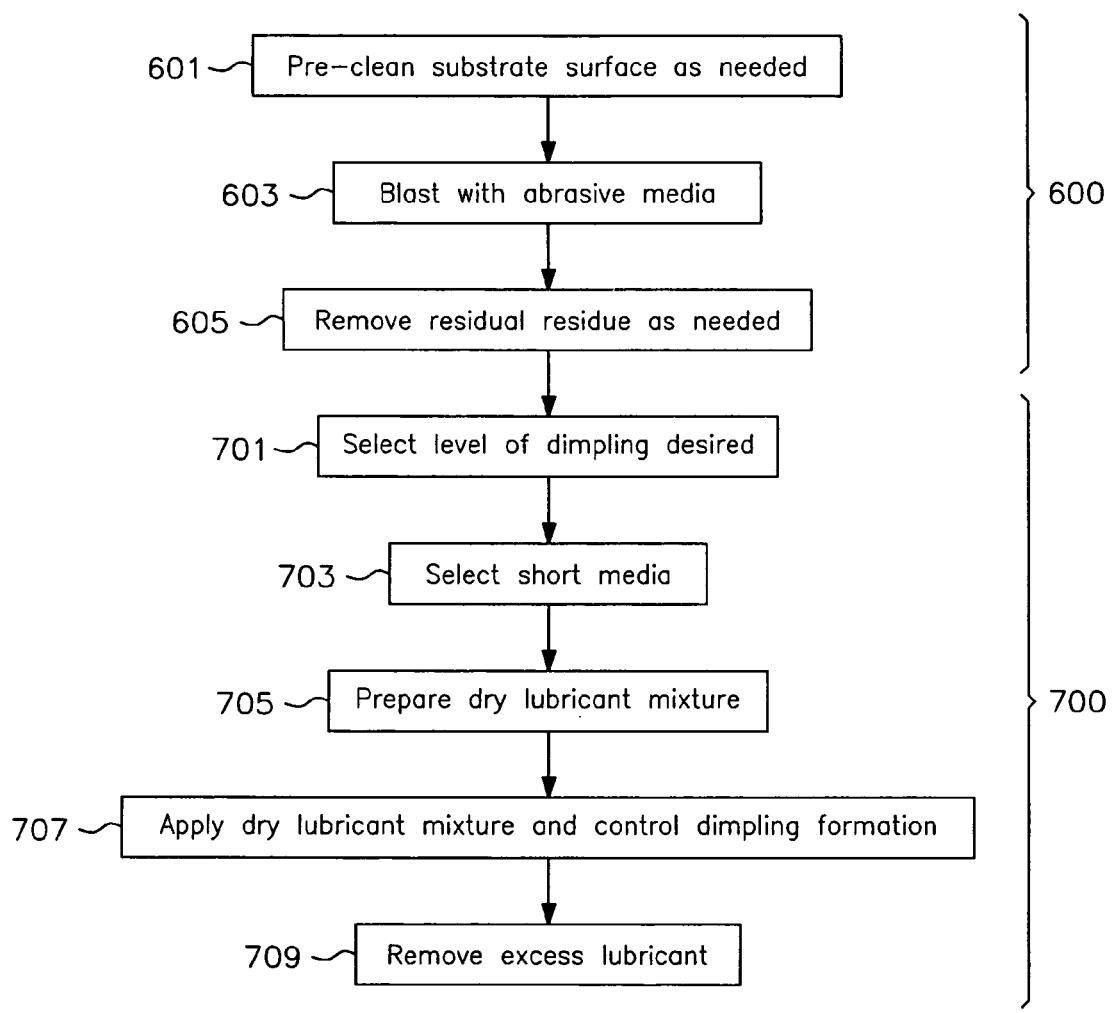
FIG. 12 is a flowchart of the method steps for producing a reduced-friction surface, in accordance with a second embodiment of the present invention.

As will be discussed in greater detail hereinafter and as summarized in FIG. 12, the method of the second embodiment as performed independently broadly includes the steps of cleaning the surface, step 600, and applying the dry lubricant thereto by impingement while at the same time controlling the level of dimpling saturation of the substrate, step 700.

Reference is made to the discussion of surface cleaning in connection with the first embodiment as also being applicable here. Accordingly, the material relating to surface cleaning will not be repeated with the understanding that the same considerations apply in connection with each of the numbered steps.

The distance between the nozzle and the substrate surface during the abrasive treatment preparatory to impingement and concurrent dimpling can be from about 0.5-12 inches, but preferably is about four inches, with a nozzle pressure ranging from 20-180 psi, and more preferably from about 30 psi-100 psi. The nozzle may be angled to be as oblique as 10 degrees relative to the substrate surface, but it is preferable to have the nozzle oriented to be substantially perpendicular to the substrate surface.

After the part has been uniformly cleaned, residual residue from the abrasive cleaning media is removed, step 605. The residual residue removal step is preferably performed by directing a compressed gas, generally air, nitrogen or argon, against the substrate surface with sufficient pressure to remove any residual abrasive cleaning media remaining adhered thereto. In some cases the residual abrasive may not be sufficiently removed with compressed gas. In such cases it may be necessary to use aqueous or solvent cleaning assisted by agitation, scrubbing, or ultrasonic cleaning.

When cleaning is complete, the surface is ready for application of the dry lubricant by impingement, step 700. This stage of the method includes four phases, namely selecting the level of dimpling desired, step 701, selection of the appropriate shot, step 703, preparation of a dry lubricant mixture, step 705, and application thereof to the substrate, step 707.

The level of dimpling desired will be selected based on a number of factors specific for the given application. For ease of discussion, dimple saturation will be selected from one of five categories: very low (<1%), low (1% to less than 10%), medium (10% to less than 30%), high (30% to less than 98%) and complete (98% and over). Much of the decision will be based on empirical data or extension of prior experience.

In general, oil-lubricated applications which have a conformal contact area and a significant component of sliding (vs. rolling) will benefit from dimpling of the surface. Dimpling levels from low to complete may be used, but dimpling levels of low or medium are preferred.

Applications which have non-conformal (point or line) contact and a minimal component of sliding (i.e., mainly rolling) will benefit from the prevention of dimpling. Thus, keeping the dimpling level low or very low is preferred for these types of applications. The present invention allows for control of the level of dimpling in order to produce the optimized degree of dimpling for any given application.

The next step, selection of the shot media, step 703, is based on the desired dimpling level determined in step 701 and the hardness of the substrate. The hardness of the substrate and the hardness of the shot will each fit into one of three categories: soft (150 HV or less), medium hard (151 HV to 500 HV), or hard (501 HV or higher). For each possible combination of substrate hardness and selected dimpling level, there is at least one shot and processing combination which will be acceptable. However, the shot selection and process parameters used will be more limited in some combinations. The preferred shot selection categories are listed in the Shot Selection Table (Table III) in capital letters (S, Soft; M, Medium; and H, Hard). Shot selections which are acceptable but less preferred are given in lower case letters (m, medium; and h, hard) in Table III.

TABLE III

Shot selection Table. Preferred selections are indicated in capital letters.

| Substrate →<br>Dimpling ↓ | Soft<br>(≦150 HV) | Medium<br>(151 HV-500 HV) | Hard<br>(>500 HV) |
|---|---|---|---|
| Very Low (<1%) | S, m, h | S, m, h | S, M, h |
| Low (1% to <10%) | S, m, h | S, M, h | M, h |
| Medium (10% to <30%) | S, M, h | M, h | M, H |
| High (30% to <98%) | M, h | M, H | H |
| Complete (≧98) | M, H | H | H |

Examples of shot selection for each hardness category are given in the shot sample table (Table IV). This is in no way an exhaustive list but rather a sampling of possible selections.

TABLE IV

Shot Example Table

| Hardness Range | Material | Size (micron) | Hardness (HV) |
|---|---|---|---|
| Soft | 99% Al | 400 ave. | 34 |
| Medium | Stainless Steel | 180 ave. | 470 |
| Hard | Glass Bead | 53 to 125 | 520 |

In addition to 99% pure aluminum, other soft shot materials include copper, copper alloy, aluminum alloy (for example, A319), zinc, polymer, corn cob, pumice and walnut shell. Other examples of medium shot besides stainless steel include steel, steel alloy, titanium, titanium alloy, nickel and nickel alloy. Further hard shot materials in addition to glass bead include hardened steel alloy, nickel, nickel alloy and ceramic bead.

The carrier media or peening particles are typically spherical in shape. For economic reasons it may be necessary to select shot that is not spherical. Due to less expensive manufacturing methods the shot may be tear-drop (as-cast type shot), cylindrical (cut wire type shot), or other shapes that are approximately spherical or predominantly cylindrical.

It is generally desirable to use shot size that is as small as possible from what is available, with typical sizes being between 150 and 400 micron (0.006 and 0.016 inches) However, sizes of between 50 and 10000 micron (0.002 inches and of up to 0.39 inches) in diameter may be used. Shot sizes for 99% pure aluminum and A319 aluminum alloy are generally between about 100 and 1000 micron. The average size of stainless steel shot is also between about 100 and 1000 micron, and more preferably between 150 and 500 micron.

During dry lubricant mixture preparation, step 705, a dry lubricant mixture is made from a combination of various dry lubricants (generally dichalcogenide and polymer) and peening particles. The dry lubricant mixture is mixed in a mixer appropriate for mixing powders, such as with a V-mixer, for the purpose of minimizing agglomeration, while maximizing the coverage of the lubricant powders onto the shot.

As a step preliminary to preparation of the mixture, a dry lubricant powder must be chosen. Typically this is molybdenum disulfide, tungsten disulfide, or the polymer PTFE. However, a range of dry lubricants may be suitably used, including, the group known as dichalcogenides (the sulfides and selenides of molybdenum, tantalum, tungsten and niobium), graphite, and other solids with lamellar (graphite like) atomic crystal structure. A mixture of one or more dry lubricants may also be used, such as one or more dichalcogenides with PTFE or graphite.

When choosing sizes of powder and shot, preferably the grains of dry lubricant are no more than half the size of the shot and, more preferably, are 1 to 30 micron in diameter.

When mixing the lubricant powder with the shot, comparable considerations apply to those already presented in connection with the first embodiment. Accordingly, common subject matter will not be repeated here.

While the step of preparing the dry lubricant mixture is shown in the figure as following the cleaning, step 600, preparation of the dry lubricant mixture could, of course, be completed prior to the cleaning step or concurrently therewith as would be understood by persons of ordinary skill in the art. Accordingly, the invention is not intended to be limited to the specific sequence shown in the figure, except to the extent that the cleaning, step 600, precedes the peening process, step 707.

After blending the dry lubricant mixture, step 705, the mixture is transferred into a process cabinet or similar enclosure for the application of the mixture to the substrate, step 707. Care must be taken to avoid re-contamination of the cleaned part, and the use of gloves at all times is recommended if the parts are to be handled manually.

As with the first embodiment, it is advisable to use a separate process cabinet or enclosure from that used during the cleaning, step 600, to prevent contamination. The process settings for the dry lubricant application or peening step, step 707, are very similar to those used during the abrasive cleaning, step 603. The peening particles are entrained in a carrier gas, generally ambient air, and are directed against the substrate surface through one or more nozzles within the cabinet enclosure. The cabinet enclosure may contain an ambient air environment or may have a controlled environment, i.e., an inert gas such as argon, in order to control the rate of oxidation. The need for a controlled environment will depend upon the mix of dry lubricant being used and the composition of the metal substrate.

The nozzle distance for peening is generally about four inches from the surface of the substrate, although it may range from about 0.5 inches to 12 inches. The nozzle pressure may be from 10-180 psi, but is preferably in the range of 20-100 psi. While the nozzle may be angled to be as oblique as 10 degrees relative to the substrate surface, it is preferable to have the nozzle oriented to be substantially perpendicular to the substrate surface.

Nozzle pressures will vary according to the level of dimpling saturation desired. With an indirect pressure type nozzle and a desired dimpling saturation of less than 10%, the preferred pressure setting is between about 20 and 70 psi. If medium dimpling is desired, the pressure setting would be preferably between about 30 and 100 psi. For high dimpling saturation with an indirect pressure type nozzle, the pressure setting would preferably be between about 40 and 100 psi and, for complete dimpling, a pressure setting of between about 70 and 100 psi is preferred.

Ranges of pressure settings for a direct pressure type nozzle also vary according to the desired amount of dimpling, with an overall range of between about 5 and 100 psi. For low dimpling saturation, the pressure setting is more preferably between about 10 and 40 psi. If medium dimpling is desired, the pressure setting is more preferably between about 15 and 50 psi. High dimpling saturation has a preferred pressure setting of between about 20 and 60 psi, while complete dimpling has a preferred pressure setting of between about 30 and 90 psi.

Shot velocity may also be provided by a rotating bladed wheel or by gravity.

Treatment time for application of the dry lubricant mixture to the metal substrate is a function of the spray pattern size and the part size. If the spray pattern from the nozzle covers the entire part, the treatment time will typically range from 5 seconds to 300 seconds. If, however, the nozzle spray pattern covers some area less than the entire part, then the treatment time must be increased by a multiple corresponding to the coverage area as required to provide full coverage of the part (substrate). For example, if the nozzle spray pattern covers one fourth of the part, the treatment time will be four times longer than that which would be required if the nozzle spray pattern covered the entire part. Hence, with a pattern covering only one fourth of the part, the treatment time would range from 20 seconds to 1200 seconds. Multiple nozzles may be used to decrease the treatment time by allowing more area to be covered simultaneously.

The treatment time will be bracketed between a minimum required and a maximum allowed. The minimum treatment time is determined by the requirement of full peening coverage in order to achieve full dry lubricant coverage of the substrate. This will be readily apparent by visual examination for full dry lubricant coverage on the part. The maximum treatment time is determined by the upper level of dimple saturation desired for the part (as measured by the method in Example XI or an equivalent method). Most typical treatment times range from 30 seconds to 120 seconds per nozzle spray pattern unit area.

Interlocking between the dry lubricant powder and the surface of the metal substrate during the impinging step creates a mechanical bond, with pressure from the impingement process pushing the dry lubricant particles into the surface of the substrate. Kinetic energy that results from the collision of the shot hitting the substrate surface essentially provides a low temperature pressure bond, also called a metallurgical bond, of the dry lubricant onto the surface of the metal substrate.

Simultaneously the shot may, in accordance with the present invention, create a pattern of dimples on the surface of the substrate at some rate less than the rate of peening coverage. Further illustration of this will be given in the examples that follow. In general, when peening particles are forming dimples, the longer the peening time, the greater the number of dimples created per unit area. The fact that dimples are formed at a lower rate than peening coverage is due to the higher energy requirement for dimple formation and the statistical distribution of those particles within the totality of the peening particles having sufficient energy to form a dimple. Less energy is required to apply the dry lubricant so that a greater percentage of the peening particles meet the necessary energy threshold for such application.

A dimple is an impression made in the surface of the substrate by the impacting shot particle. In an idealized case, a spherical particle will leave a hemispherical dimple, provided that the particle carries sufficient kinetic energy to cause a dimple. The technique according to the present invention, however, is not limited to the idealized geometry and it is recognized that real particles will often have non-uniform shapes and the dimple left by the particle is likely to reflect the non-idealized shape. The depth and diameter of the dimple will also be a function of the size and kinetic energy of the particle.

Saturation of dimpling can be from 0% to 100%. For convenience, ranges are defined herein as very low (<1%), low (1% to less than 10%), medium (10% to less than 30%), high (30% to less than 98%) and complete (98% and over). Oversaturation can occur by increased time of blasting in a given area where depressions left in the substrate overlap substantially; this is included in the complete saturation category.

Dimples must be distinguished from the general surface roughness already present on the substrate or produced through abrasive surface preparation. The general surface roughness may be present as a result of manufacturing steps such as lathe turning, milling, grinding, abrasive blasting, or such steps the shape and size of which would be readily recognized by those skilled in the art of machining and surface preparation.

The average surface roughness is expressed according to engineering standards as the "arithmetic average of the absolute values of the measured profile height deviations taken within the sampling length and measured from the graphical centerline" (Machinery's Handbook). The surface roughness created by common manufacturing methods is typically of a uniform type and on a scale of from 0.010 micrometer to 25 micrometer (0.5 to 1000 micro inch) but more typically from 0.1 to 1.6 micrometer (4 to 63 micro inch). The depth of dimples created using the present invention will typically be in the range of from about 0.1 micrometer to 500 and more typically in the range of from about 0.2 micrometer to 3.2 micrometer. While these ranges overlap, the dimple can only be defined in terms of its relationship to the surface roughness of the specific substrate.

Specifically, a dimple is distinguished from general surface roughness by defining a minimum depth of the impression (hmin) caused by the impact of the shot media as twice that of the average surface roughness (Ra); thus, hmin=2×Ra. So if the surface roughness of the sample is, for example, 0.5 micrometer, then an impression must have a minimum depth of 1.0 micrometer to be defined as a dimple.

An individual dimple will be created on the surface of the substrate if a particle (shot media), upon collision with the substrate, transmits sufficient energy to the substrate. The kinetic energy of a particle (E) is determined by the well known relationship of the particle's mass (m) and velocity (V), $E=\frac{1}{2}mV^2$. The energy carried by the particle must, by physical law, be conserved. A portion of the energy is used to bond the dry lubricant to the substrate and is an important function of the present invention. The energy may also be transferred to the substrate in the form of deformation as in a dimple in the substrate, and a portion may go to heating of the substrate. In addition, some portion of the energy may be retained in the shot media in the form of deformation of the shot media, heating of the shot media, or rebound of the shot media. In view of these variations, four outcomes of a collision of shot media with a substrate are summarized in FIGS. 13 (A, B, C, and D).

If the shot is soft relative to the substrate, it will be more likely to deform and leave the substrate without a dimple but may still transmit sufficient energy to bond the dry lubricant to the substrate. If the shot is hard relative to the substrate but has low mass and or velocity, the energy may be sufficient to bond the dry lubricant to the substrate but not to leave a dimple. If the shot is hard relative to the substrate and has sufficient mass and velocity, it will bond the dry lubricant to the substrate and also cause an impression in the surface of the substrate which, depending on the application of the part, will either offer improved performance or declined performance of the component.

The different scenarios applying to the present invention are listed to improve clarity. In each case, the energy of the particle must be sufficient to bond the dry lubricant to the surface. For each specific component end use, the user must determine, through a standard testing protocol (e.g., Czichos), the level of dimpling in combination with the applied dry lubricant that provides the enhanced performance sought.

Scenario 1: Select shot media of hardness less than the substrate and of a small enough size and delivered at a low enough velocity so as to not alter the surface morphology of the substrate when the fit and or/performance requirement is such that the maximum benefit is gained from low dimple saturation of the part. This is represented by B or C of FIG. 13, and FIG. 14.

Scenario 2: Select shot media of hardness less than the substrate and of a substantial enough size and delivered at a high enough velocity so as to alter the surface morphology of the substrate when the tribological performance is enhanced by the dimpling of the surface. The dimpling caused may be medium, high, or complete saturation. This is represented by D of FIG. 13, and FIG. 15, 16 or 17.

Scenario 3: Select shot media of hardness near the substrate hardness and of an appropriately small size, and delivered at a low enough velocity so as to not alter the surface of the substrate significantly, leaving low dimple saturation. This is represented by B or C of FIG. 13, and FIG. 14.

Scenario 4: Select shot media of hardness near the substrate hardness and of an appropriate size so as to cause a dimpling of the surface with a size and frequency of dimples desired. The level of saturation may be medium, high, or complete. This is represented by A or D of FIG. 13, and FIG. 15, 16 or 17.

Scenario 5: Select shot media of hardness higher than the substrate hardness and of an appropriately small size, and delivered at a low enough velocity so as to not alter the surface of the substrate significantly, leaving low saturation. This is represented by B of FIG. 13, and FIG. 14.

Scenario 6: Select shot media of hardness higher than the substrate hardness and of an appropriate size so as to cause a dimpling of the surface with a size and frequency of dimples desired. The level of saturation may be medium, high, or complete. This is represented by A of FIG. 13, and FIG. 15, 16 or 17.

Dimple saturation is different from peening saturation (see Example XI). Those skilled in the art of shot peening will be familiar with the definition of peening saturation. Peening saturation is the percent of the treated surface area that has been impacted by a peening particle. The important distinction is that the impact of a peening particle does not always lead to a dimple as defined herein due to the differing energy requirements for each as already noted. The technique of the present invention discloses peening methods in which it is possible to achieve complete peening saturation and at the same time control the level of dimple saturation to a level that is less than complete saturation. This control gives the ability to completely cover the surface with dry lubricant treatment (due to the complete peening saturation) and at the same time introduce a controlled level of dimpling on the surface of the part which enhances the performance of the part.

After the part has been uniformly processed, it is advisable to inspect the part to ensure that all unbonded dry lubricant powder has been removed. Failure to remove such residue can result in significant performance degradation as the effect of the unbonded lubricant is opposite that intended, namely that friction in the resulting part is increased rather than reduced. Hence, to ensure removal of residual dry lubricant and carrier media, the surface is preferably blown off by compressed air or other methods, step 709.

Six examples applying to the second embodiment of the present invention are given to improve the clarity of the process (Examples V through X). Example XI is a demonstration of the difference between peening saturation and dimple saturation. Example XII is a demonstration of the way in which the dimple saturation level can be controlled using process parameters. Example XIII shows the improvement in efficiency and wear for an industrial gear box treated with the present invention.

EXAMPLE V

A spherical roller element bearing is used in a bearing race (track) such that the contact area between the rolling element and the track is essentially point contact. Due to the loads, speeds, and acceleration the bearing/track experiences in service, unavoidable sliding occurs between the rolling element and the track. The bearing in question is to be used without the application of oil. The bearing track is to be treated with the process of the present invention to reduce friction and wear when the unavoidable sliding occurs. Since it is a non-oiled application and the contact is primarily rolling, the dimpling level selected, step 701, is very low (<1%) as shown in FIG. 12.

The track is a high hardness bearing alloy (52100, 700 HV hardness). Referring to the shot selection table (Table III) it is seen that soft, medium, or hard shot are acceptable for use, but soft or medium shot is preferred. A soft shot, 99% pure aluminum (34 HV hardness, 400 micron average diameter), is selected, step 703. The shot is mixed with the dry lubricants, Molybdenum disulfide and PTFE, for 15 minutes in a v-mixer to coat the shot, step 705.

The bearing track is cleaned, step 601, in an ultrasonic cleaning tank using aqueous cleaning solution, rinsed, and dried. The track surface is then cleaned with aluminum oxide abrasive (35 micron) using a dry blast cabinet at 70 psi, step 603. Residual aluminum oxide is removed using compressed air, step 605. The track is then treated using a dry blast cabinet with a pressure setting of 40 psi to deliver the dry lubricant coated shot to the substrate surface, leaving the bearing track impregnated with dry lubricant, step 707. Excess dry lubricant is removed using compressed air, step 709.

The selection of the soft shot relative to the hard substrate is more important than the pressure setting. The use of soft shot keeps the dimpling saturation of the track very low which allows the spherical rolling element to roll smoothly in the track. The dry lubricant-impregnated surface reduces friction and wear between the rolling element and the track when sliding does occur. The interaction between the shot and the substrate is schematically represented in C of FIG. 13.

EXAMPLE VI

A bronze worm gear (140 HV) is used in a speed reducer. The bronze gear is run in contact with a hardened steel worm. During use there is an area of contact between the worm gear teeth and the worm teeth. The speed reducer is an enclosed system and uses gear oil for lubrication. The present invention is used as a surface treatment on the gear to supplement the oil in reducing the friction and wear between the bronze gear and steel worm, thus providing for a gear box of higher efficiency and longer life.

Since the gear is used with oil, and the gear mesh provides for an area of contact, a dimpled surface will provide the added benefit of maintaining oil in the contact area. The dimples provide for a reservoir of oil within the contact patch between the bronze gear and the steel worm. The non-dimpled areas of the gear face are also impregnated with dry lubricant and provide for reduced sliding friction and reduced wear between the bronze gear and the steel worm. The dimpling level selected is medium (10% to <30%), step 701.

Referring to the shot selection table (Table III) for a soft substrate with a medium level of dimple saturation it is seen that soft or medium shot is preferred. For the treatment process, soft 99% pure Al shot (34 HV, 400 micron) is selected to treat the 140 HV hardness gear, step 701.

The shot is mixed with molybdenum disulfide for 15 minutes in a v-mixer to coat the shot, step 705.

The gear is delivered clean from the previous manufacturing step and so step 601 is not required. The gear teeth are abrasively cleaned using aluminum oxide in a dry blast cabinet with a setting of 40 psi, step 603. The residual abrasive is removed from the gear by ultrasonic washing in an aqueous solution, step 605.

The mixture of the shot and dry lubricant is delivered to the surface of the gear teeth using a dry blast cabinet with a setting of 100 psi for 5 minutes, the relatively high pressure being used to increase the shot velocity and thus impart a medium level of dimpling on the gear teeth while simultaneously depositing the dry lubricant over the entire gear tooth surface, step 707. The excess dry lubricant is removed using compressed air, step 709. The interaction between the shot and the substrate is schematically represented in D of FIG. 13. Appearance of the dimples on the gear tooth surface under 10× magnification is represented schematically in FIG. 15.

EXAMPLE VII

A forge tool made of H13 tool steel (544 HV hardness) is used in a metal forming application. The high use temperature limits the ability of oil to prevent surface wear, resulting in a short use life for the tool. The tool is to be treated with dry lubricants according to the present invention. The level of dimpling is to be kept very low or low (<10%) since dimpling is expected to cause galling (smearing) between the metal being formed and the forge tool, step 701. Also, the advantage of dimpling acting as a reservoir for oil does not apply in this case since the working temperature is too high for oil to survive.

Referring to the shot selection table (Table III) for a hard substrate and maintaining a very low or low level of dimple saturation it is seen that a soft or medium shot is preferred. Stainless steel shot of medium hardness (470 HV, 180 micron) is selected, step 703. The shot is mixed with tungsten disulfide in a v-mixer for 20 minutes, step 705.

The forge tool is cleaned with an alcohol soaked cloth, step 601, and is abrasively cleaned with aluminum oxide in a dry blast cabinet at 70 psi, step 603. Excess abrasive is removed with an alcohol soaked cloth, step 605.

The dry lubricant is delivered to the substrate using a dry blast cabinet with a pressure setting of 40 psi. The lower pressure setting is used to keep shot velocity low and thus the dimpling very low or low, step 707. The excess lubricant is wiped off with a dry cloth, step 709. The interaction between the shot and the substrate is schematically represented in B of FIG. 13.

The H13 forge tool impregnated with the dry lubricant lasts two to three times the number of cycles as compared to the untreated forge tool.

EXAMPLE VIII

A forged aluminum piston (alloy 2618, 107 HV hardness) used in an internal combustion engine is to be treated with dry lubricant according to the present invention. Due to the reciprocating motion of the piston in the engine, the velocity momentarily reaches zero on each stroke of the piston. For much of the cycle of the engine the piston is traveling at a high enough velocity so that a film of oil develops between the piston and the combustion cylinder, a well known phenomenon called hydrodynamic lubrication. However, at the end of each stroke as the velocity approaches zero, the hydrodynamic effect does not apply and the piston surface experiences higher friction and wear. For this application a low level of dimpling is selected, step 701. The dimples in the piston surface act as a reservoir for oil to provide an increased amount of lubricant available at the end of each stroke, and the dry lubricant impregnated surface of the piston reduces the amount of friction and wear between the piston surface and the cylinder wall for the unavoidable contact that takes place at the end of each stroke of the piston.

Referring to the shot selection table Table III for a soft substrate for a low level of dimpling it is seen that a soft shot is preferred. A319 aluminum alloy shot (107 HV, 400 micron) is selected, step 703. The shot is mixed with molybdenum disulfide and PTFE in a v-mixer for 15 minutes to coat the shot, step 705.

The aluminum piston is cleaned in a vapor degreaser to remove residual surface contaminants, step 601. The piston is then abrasively cleaned in a direct pressure blast cabinet with glass bead (35 micron) at 30 psi, step 603. The residual glass bead is removed with compressed air, step 605.

The dry lubricant is delivered to the surface using a dry blast cabinet with a pressure setting of 60 psi for 5 minutes, the moderate pressure being used to provide some dimpling but keeping it below 10% (low level). The time of treatment is controlled to provide full dry lubricant coverage but also to ensure a low level of dimpling. The interaction of the shot with the substrate is as shown in D of FIG. 13. Appearance of the dimples on the piston surface under 10× magnification is represented schematically in FIG. 14.

EXAMPLE IX

A telescoping tube made of 6061-T6 aluminum (107 HV) and sliding against a polymer sleeve is used as part of a fluid delivery pump. In the original design the aluminum tube is subject to a high rate of wear due to galling (smearing) caused by rubbing against the polymer sleeve. Oil is not used for lubrication between the aluminum tube and the polymer sleeve due to likely contamination of the fluid being pumped. Since no oil is used in this application, dimpling of the surface would not provide the benefit of an oil reservoir. Also, since the tube is to deliver the fluid without leaks, dimpling is to be avoided. The dimpling level selected is very low, step 701.

Referring to the shot selection table (Table III) for a soft substrate and a very low level of dimpling it is seen that soft, medium, or hard shot is acceptable but soft shot is preferred. However, due to cost considerations for the part, glass bead (520 HV, hard, 53 to 125 micron) is selected since it is available for 15% of the cost of the soft or medium shot, step 703. The glass bead selected is on the smaller side of the range of sizes for shot in order to reduce the mass and prevent dimpling. The glass bead is mixed with molybdenum disulfide and PTFE in a v-mixer for 30 minutes to coat the shot, step 705.

The aluminum tube is delivered relatively clean so a manual wipe down with an alcohol soaked cloth is used to remove residual oils, step 601. The tube is abrasively cleaned with aluminum oxide in a dry blast cabinet at 40 psi, step 603. Residual aluminum oxide is removed with compressed air, step 605.

The 6061-T6 aluminum alloy tube (107 HV) is treated with dry lubricant according to the present invention using a glass bead shot (520 HV, 53 to 125 micron size) mixed with dry lubricant. The shot mixture is delivered to the surface of the substrate using a dry blast cabinet with a pressure setting of 30 psi. The low pressure setting is used in order to keep dimpling to a very low level. The aluminum surface is impregnated with dry lubricant without the formation of dimples because the beads are small and the velocity is kept low with the low delivery pressure. The interaction of the shot with the substrate is as shown in B of FIG. 13.

EXAMPLE X

As in Example VIII, an aluminum piston for an internal combustion engine is to be treated. The piston is to be given a medium level of dimpling in order to improve scuffing (piston surface damage) resistance, step 701. Referring to the shot selection table (Table III) for a soft substrate with a medium level of dimpling, it is seen that soft or medium shot is preferred. Stainless steel shot of medium hardness (470 HV hardness, 180 micron) is selected, step 703. The shot is mixed with molybdenum disulfide and PTFE in a v-mixer for 10 minutes to coat the shot, step 705.

The aluminum piston is cleaned in a vapor degreaser to remove residual surface contaminants, step 601. The piston is then abrasively cleaned in a direct pressure blast cabinet with glass bead (35 micron) at 30 psi, step 603. The residual glass bead is removed with compressed air, step 605.

The dry lubricant is delivered to the surface using a dry blast cabinet with a pressure setting of 40 psi for 5 minutes. The moderate pressure being used with the hard shot provides a medium level of dimpling, step 707. The time of treatment is controlled to provide full dry lubricant coverage.

Figure 13:
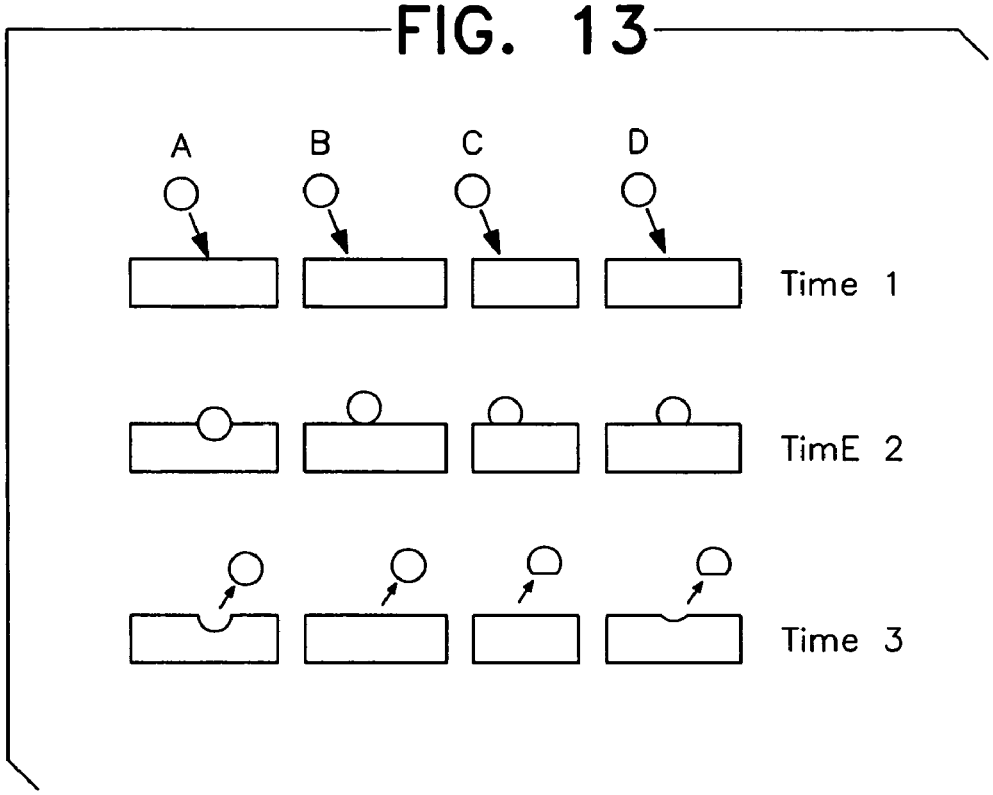
FIG. 13 is a schematic representation of the different resulting scenarios for deformation of the shot and/or substrate depending on the relative hardness of the shot and substrate.
Figure 14:
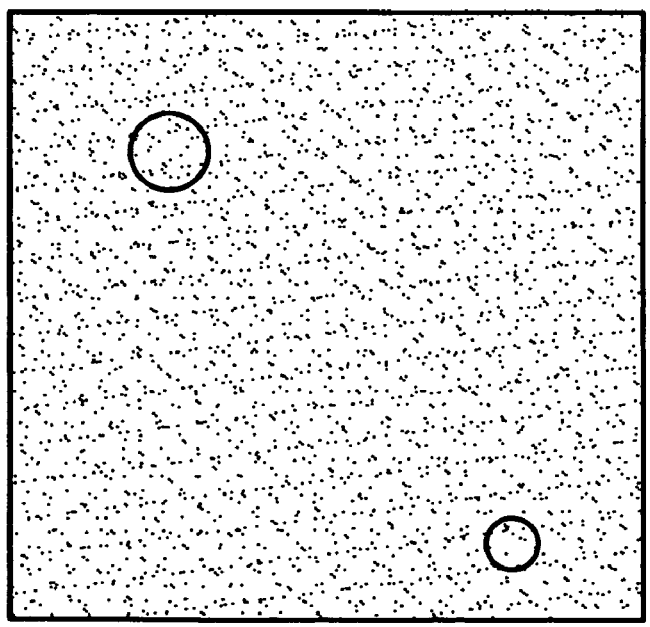
FIG. 14 is a schematic of a substrate with low dimpling saturation (1% to less than 10%) from shot particles.
Figure 15:
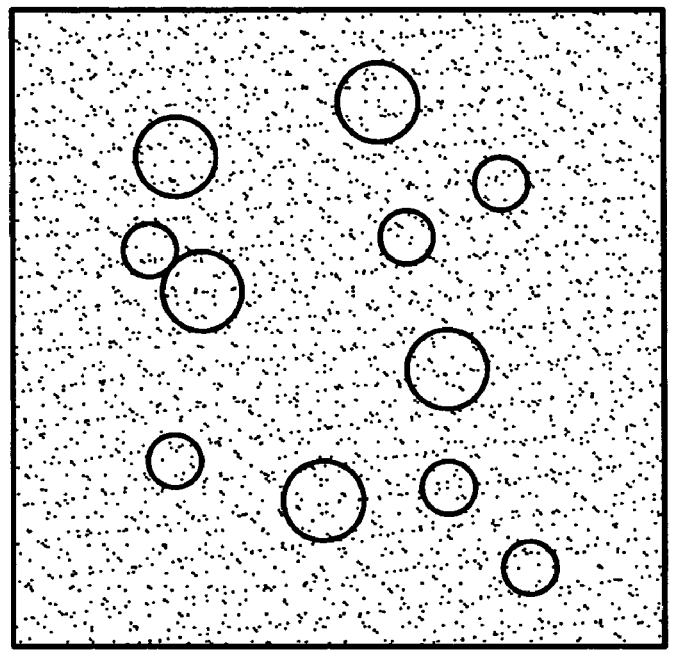
FIG. 15 is a schematic of a substrate with medium dimpling saturation (10% to less than 30%) from shot particles.
Figure 16:
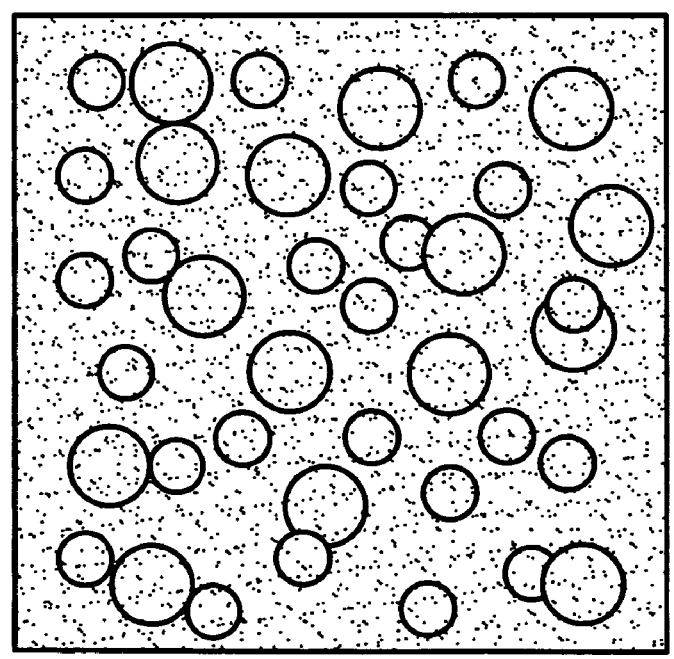
FIG. 16 is a schematic of a substrate with high dimpling saturation (30% to less than 98%) from shot particles.
Figure 17:
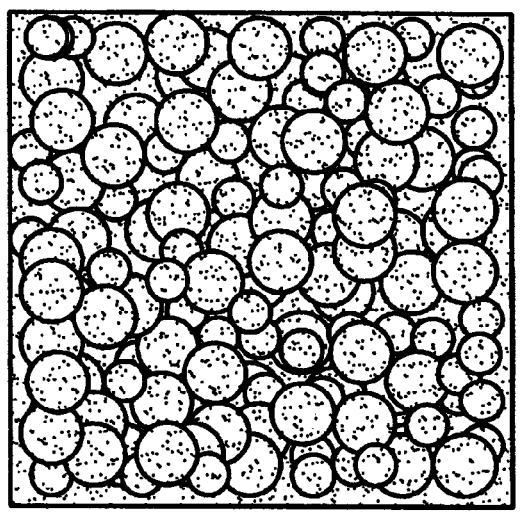
FIG. 17 is a schematic of a substrate with complete dimpling saturation (>98%) from shot particles.

The interaction of the shot with the substrate is as shown in A of FIG. 13. Appearance of the dimples on the piston surface under 10× magnification is represented schematically in FIG. 15.

The dimples in the piston surface act as a reservoir for oil to provide an increased amount of lubricant available at the end of each stroke and the dry lubricant impregnated surface of the piston reduces the amount of friction and wear between the piston surface and the cylinder wall for the unavoidable contact that takes place at the end of each stroke of the piston.

EXAMPLE XI

This example demonstrates an important distinction between peening coverage and dimple saturation. Peening coverage is well understood to those practiced in the art of shot peening. This example demonstrates complete peening saturation of an aluminum alloy surface with various levels of dimpling saturation.

The size (diameter, d) of a dimple on the surface of a part can be related to the depth of the dimple impression (h) if the size of the shot particle (p) is known. The well known math relationship is shown in equation 1.

$$d = 2\sqrt{h(p-h)} \quad \text{(equation 1)}$$

where d=dimple diameter (micron)

h=dimple depth (micron)

p=shot diameter (micron)

Also, the shot peening surface coverage is defined by the well known relation shown in equation 2

$$C_n = 1-(1-C_1)$$ (equation 2)

where $C_1$=the percentage of coverage after one cycle (%)

n=number of cycles (1/sec)

$C_n$=peening coverage after n cycles (%)

By convention complete shot peening coverage is defined as $C_n \geq 98\%$, that is, 98% or more of the surface has been impacted by a peening particle. One practical method of determining shot peening coverage is by visual examination of dye removal from a surface. A sample surface is painted with dye and treated under a set of conditions at varying times and then examined at 10× magnification. At the time interval where no more dye is observed on the sample surface peening coverage is considered complete.

Using this procedure, nine 6061 aluminum strips having an average surface roughness of 0.5 micron (20 micro inch) and a hardness of about 122 HV were painted with dye. The samples were then blasted with 99% Al shot with an average size of 400 micron and a hardness of about 34 HV using an indirect pressure dry blast cabinet. Three settings for shot delivery air pressure were used (40, 70, and 100 psi). Also, the times were varied to determine the minimum time for complete dye removal (and thus complete shot peening coverage).

TABLE V

| Sample No | Pressure | Time | Complete Dye removal at 10X? |
|---|---|---|---|
| 1 | 40 | 60 | No |
| 2 | 40 | 70 | Yes |
| 3 | 40 | 80 | Yes |
| 4 | 70 | 30 | No |
| 5 | 70 | 40 | Yes |
| 6 | 70 | 60 | Yes |
| 7 | 100 | 20 | No |
| 8 | 100 | 30 | Yes |
| 9 | 100 | 40 | Yes |

From Table V the times for complete dye removal (complete shot peening coverage) vary by the delivery air pressure used, these results are summarized in Table VI. As the delivery pressure is increased from 40 psi to 100 psi the time to achieve complete peening coverage is reduced from 70 seconds to 30 seconds.

TABLE VI

| Sample No | Pressure | Time |
|---|---|---|
| 2 | 40 | 70 |
| 5 | 70 | 40 |
| 8 | 100 | 30 |

According to the definition of a dimple for the present invention the minimum dimple depth (hmin) is hmin=Ra×2. For this example, the average surface roughness (Ra) of the aluminum strips was 0.5 micron. Therefore, hmin=0.5 micron×2=1 micron.

Using (equation 1) and entering the shot size (p=400 micron) and the minimum dimple depth (hmin=1 micron), one calculates that the minimum diameter for an impression to be defined as a dimple is 40 micron (dmin=40 micron). That is, when examining the sample from above the surface, any dimple of 40 micron or larger will have a depth of 1 micron or greater.

Samples 2, 5, and 8 were examined under 20× to 40× magnification and the percent dimple coverage was calculated using a 100 point grid overlay. Grid overlay is a well known method for calculating percent area in microscopic examination. Dimples with a diameter larger than 40 micron (thus a depth of 1 micron or more) were considered. Dimples intersecting the grid points were counted and then the ratio of dimples counted divided by the number of grid points was calculated and expressed as a percent area of dimple coverage. The results are shown in Table VII. Note that for this example the dimple saturation is between 9% and 13% when peening saturation is 100%. This clearly illustrates that dimple coverage is different than peening coverage.

TABLE VII

| Sample | Pressure | Time | Peen Saturation (%) | Dimple Saturation (%) |
|---|---|---|---|---|
| 2 | 40 | 70 | 100 | 13 |
| 5 | 70 | 40 | 100 | 10.5 |
| 8 | 100 | 30 | 100 | 9 |

EXAMPLE XII

Figure 18:
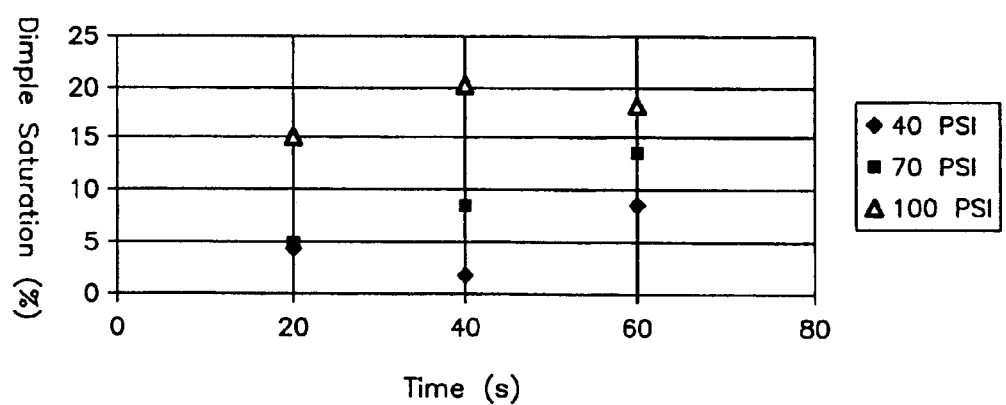
FIG. 18 is a graph of dimple saturation as a function of shot delivery pressure and time.

Nine 6061 aluminum strips with a hardness of about 122 HV were blasted with 99% Al shot of 400 micron diameter and a hardness of about 34 HV. The blasting pressure and time were varied as defined by a central composite design matrix as shown in Table VIII. The results are also plotted in FIG. 18. Dimple saturation for each sample was determined as outlined in Example XI. The results clearly show that dimple saturation can be controlled by controlling delivery pressure and time.

TABLE VIII

| Sample No | Pressure (psi) | Time (s) | Dimple Saturation (%) |
|---|---|---|---|
| 1 | 40 | 20 | 1.8 +/− 1.3 |
| 2 | 40 | 40 | 4.3 +/− 2.1 |
| 3 | 40 | 60 | 8.5 +/− 2.9 |
| 4 | 70 | 20 | 4.8 +/− 2.2 |
| 5 | 70 | 40 | 8.3 +/− 2.9 |
| 6 | 70 | 60 | 13.5 +/− 3.7 |
| 7 | 100 | 20 | 15 +/− 3.9 |
| 8 | 100 | 40 | 20.3 +/− 4.5 |
| 9 | 100 | 60 | 18.3 +/− 4.3 |

EXAMPLE XIII

Example of improved efficiency and reduced wear rate of an industrial type speed reducer. A comparison of efficiency and gear wear was made between a standard 20:1 worm gear type speed reducer and a speed reducer in which the worm gear was treated with the process of the present invention. The efficiency was improved and the wear was reduced for the gear treated according to the present invention. A test rig (dynamometer) was utilized in order to measure the power in vs. power out of the speed reducer. A stock speed reducer with a bronze worm gear and a steel worm was run on the test rig for a period of 12 hrs. The average efficiency measured for the period from 6 to 12 hrs of the test was 73%. The wear of the worm gear was determined by measuring the gear tooth dimension at the pitch line before and after the test in nine locations. The average wear of the untreated bronze gear run for 12 hrs was 178 micron (0.007-inch).

The bronze worm gear for a second gear box was treated according to the present invention. The gear was washed in an ultrasonic cleaner with an aqueous cleaning solution. The part was then rinsed and dried, step 601. The gear was then abrasively cleaned with aluminum oxide in a dry blast cabinet at 40 psi, step 603. The residual abrasive was removed by ultrasonic cleaning in an aqueous solution, step 605.

As discussed in Example VI, the dimpling level selected for the gear was medium saturation, step 701. Referring to the shot selection table (Table III) soft shot, 99% Al (34 HV, 400 micron) was selected, step 703. The shot was pre-coated with a mixture of molybdenum disulfide, tungsten disulfide, and PTFE by mixing in a v-mixer for 15 minutes, step 705. The dry lubricant shot mixture was delivered to the surface of the gear teeth using an indirect pressure dry blast cabinet at 100 psi, step 707. Excess lubricant was removed with compressed air, step 709. The peening coverage was complete as evidenced by complete coverage of the dry lubricant on the gear teeth. The dimple saturation was measured using the method described in Example XI and was determined to be 28% (medium saturation).

The speed reducer with the treated gear was then tested on the dynamometer under the same conditions as the untreated reducer. The average efficiency measured for the period from 6 to 12 hrs was 80%, an improvement of 11% over the stock reducer. The wear after 48 hrs was 11 micron (0.0004-inch). Note that even with a run time four times longer than the stock reducer, the wear was 94% less.

The foregoing description and drawing should be considered as illustrative only of the principles of the invention. Numerous applications of the present invention will readily occur to those skilled in the art. Therefore, it is not desired to limit the invention to the specific examples disclosed or the exact implementation shown and described. Rather, all suitable modifications and equivalents may be resorted to, falling within the scope of the invention.

What is claimed is:

1. A process for modifying a surface of a substrate for reduced friction, comprising the steps of:
    selecting peening particles by size and hardness according to a hardness of said substrate and a desired dimpling saturation;
    coating said peening particles with dry lubricant;
    setting an impact velocity that is sufficient to cause said peening particles to bond said dry lubricant to said substrate surface and which is also sufficient to produce said desired dimpling saturation in said substrate surface;
    impacting said peening particles against said substrate surface of said substrate at said selected impact velocity until 100% peening saturation is obtained;
    continuing said step of impacting after 100% peening saturation is obtained until said desired dimpling saturation is produced; and
    after said step of impacting, treating the substrate surface with a low temperature diffusion bonding process at a temperature less than half a melting point of said substrate to cause the dry lubricant to penetrate into a sub-surface beneath the substrate surface, said diffusion bonding process modifying the sub-surface of the substrate surface to a depth of approximately 2-25 microns below the substrate surface, said low temperature diffusion bonding process being performed in an absence of physical contact with said substrate, and said substrate being ready for use upon completion of said low temperature diffusion bonding process.

2. The process as set forth in claim 1, wherein said desired dimpling saturation is less than 10% and said step of selecting includes selecting peening particles from the group consisting of copper, copper alloy, aluminum, aluminum alloy, zinc, polymer, corn cob, pumice and walnut shell.

3. The process as set forth in claim 2, wherein said step of impacting is performed with an indirect pressure type nozzle at a pressure setting of between about 10 and 180 psi.

4. The process as set forth in claim 2, wherein said step of impacting is performed with an indirect pressure type nozzle at a pressure setting of between about 20 and 70 psi.

5. The process as set forth in claim 2, wherein said step of impacting is performed with a direct pressure type nozzle at a pressure setting of between about 5 and 100 psi.

6. The process as set forth in claim 2, wherein said step of impacting is performed with a direct pressure type nozzle at a pressure setting of between about 10 and 40 psi.

7. The process as set forth in claim 1, wherein said desired dimpling saturation is from about 10% to less than 30% and said step of selecting includes selecting peening particles from the group consisting of steel, steel alloy, stainless steel, titanium, titanium alloy, nickel and nickel alloy.

8. The process as set forth in claim 7, wherein said step of impacting is performed with an indirect pressure type nozzle at a pressure setting of between about 10 and 180 psi.

9. The process as set forth in claim 7, wherein said step of impacting is performed with an indirect pressure type nozzle at a pressure setting of between about 30 and 100 psi.

10. The process as set forth in claim 7, wherein said step of impacting is performed with a direct pressure type nozzle at a pressure setting of between about 5 and 100 psi.

11. The process as set forth in claim 7, wherein said step of impacting is performed with a direct pressure type nozzle at a pressure setting of between about 15 and 50 psi.

12. The process as set forth in claim 1, wherein said desired dimpling saturation is about 30% to less than 98% and said step of selecting includes selecting peening particles from the group consisting of hardened steel alloy, nickel, nickel alloy, glass bead and ceramic bead.

13. The process as set forth in claim 12, wherein said step of impacting is performed with an indirect pressure type nozzle at a pressure setting of between about 10 and 180 psi.

14. The process as set forth in claim 12, wherein said step of impacting is performed with an indirect pressure type nozzle at a pressure setting of between about 40 and 100 psi.

15. The process as set forth in claim 12, wherein said step of impacting is performed with a direct pressure type nozzle at a pressure setting of between about 5 and 100 psi.

16. The process as set forth in claim 12, wherein said step of impacting is performed with a direct pressure type nozzle at a pressure setting of between about 20 and 60 psi.

17. The process as set forth in claim 1, wherein said desired dimpling saturation is 98% or greater and said step of selecting includes selecting peening particles from the group consisting of hardened steel alloy, nickel, nickel alloy, glass bead and ceramic bead.

18. The process as set forth in claim 17, wherein said step of impacting is performed with an indirect pressure type nozzle at a pressure setting of between about 10 and 180 psi.

19. The process as set forth in claim 17, wherein said step of impacting is performed with an indirect pressure type nozzle at a pressure setting of between about 70 and 100 psi.

20. The process as set forth in claim 17, wherein said step of impacting is performed with a direct pressure type nozzle at a pressure setting of between about 5 and 100 psi.

21. The process as set forth in claim 17, wherein said step of impacting is performed with a direct pressure type nozzle at a pressure setting of between about 30 and 90 psi.

22. The process as set forth in claim 1, wherein said dimpling saturation is determined by counting a number of indentations having a depth that is twice an average surface roughness of said substrate.

23. The process as set forth in claim 22, wherein said depth is determined by a relationship between peening particle size and dimple diameter.

24. The process as set forth in claim 1, wherein said desired dimpling saturation is less than 10% and said step of selecting includes selecting peening particles having a hardness of 150 HV or less.

25. The process as set forth in claim 24, wherein said peening particles have an average diameter of between about 100 and 1000 micron.

26. The process as set forth in claim 1, wherein said desired dimpling saturation is about 10% to less than 30%, said substrate has a hardness of 150 HV or less, and said step of selecting includes selecting peening particles having a hardness of 500 HV or less.

27. The process as set forth in claim 26, wherein said peening particles have an average diameter of between about 100 and 1000 micron.

28. The process as set forth in claim 26, wherein said peening particles have an average diameter of between about 150 and 500 micron.

29. The process as set forth in claim 1, wherein said desired dimpling saturation is about 10% to less than 30%, said substrate has a hardness of about 151 HV to about 500 HV, and said step of selecting includes selecting peening particles having a hardness of about 151 HV to 500 HV.

30. The process as set forth in claim 1, wherein said desired dimpling saturation is about 10% to less than 30%, said substrate has a hardness of 501 HV or more, and said step of selecting includes selecting peening particles having a hardness of 151 HV or higher.

31. The process as set forth in claim 1, wherein said desired dimpling saturation is about 30% to less than 98%, said substrate has a hardness of 150 HV or less, and said step of selecting includes selecting peening particles having a hardness of about 151 HV to 500 HV.

32. The process as set forth in claim 1, wherein said desired dimpling saturation is about 30% to less than 98%, said substrate has a hardness of about 151 HV to about 500 HV, and said step of selecting includes selecting peening particles having a hardness of 151 HV or higher.

33. The process as set forth in claim 1, wherein said desired dimpling saturation is about 30% to less than 98%, said substrate has a hardness of 501 HV or more, and said step of selecting includes selecting peening particles having a hardness of 501 HV or higher.

34. The process as set forth in claim 1, wherein said desired dimpling saturation is 98% or greater, said substrate has a hardness of 150 HV or less, and said step of selecting includes selecting peening particles having a hardness of 151 HV or higher.

35. The process as set forth in claim 1, wherein said desired dimpling saturation is 98% or greater, said substrate has a hardness of about 151 HV to about 500 HV, and said step of selecting includes selecting peening particles having a hardness of 501 HV or higher.

36. The process as set forth in claim 1, wherein said desired dimpling saturation is 98% or greater, said substrate has a hardness of 501 HV or more, and said step of selecting includes selecting peening particles having a hardness of 501 HV or higher.

* * * * *